United States Patent
Lee et al.

(10) Patent No.: US 12,069,611 B2
(45) Date of Patent: Aug. 20, 2024

(54) METHOD FOR TRANSMITTING SIDELINK SIGNAL BY TERMINAL IN WIRELESS COMMUNICATION SYSTEM SUPPORTING SIDELINK AND APPARATUS THEREFOR

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 17/265,394

(22) PCT Filed: Aug. 8, 2019

(86) PCT No.: PCT/KR2019/010028
§ 371 (c)(1),
(2) Date: Feb. 2, 2021

(87) PCT Pub. No.: WO2020/032658
PCT Pub. Date: Feb. 13, 2020

(65) Prior Publication Data
US 2021/0314917 A1    Oct. 7, 2021

Related U.S. Application Data

(60) Provisional application No. 62/716,297, filed on Aug. 8, 2018.

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04W 24/08* (2013.01); *H04W 72/54* (2023.01); *H04W 92/18* (2013.01)

(58) Field of Classification Search
CPC ..... H04W 72/02; H04W 24/08; H04W 72/08; H04W 92/18; H04W 52/343;
(Continued)

(56) References Cited

U.S. PATENT DOCUMENTS

2019/0313279 A1* 10/2019 Li .................... H04W 72/12
2020/0036422 A1*  1/2020 Li .................... H04B 7/0695
2020/0099437 A1*  3/2020 Harada ............... H04W 76/19
(Continued)

FOREIGN PATENT DOCUMENTS

WO    2017176099    10/2017

OTHER PUBLICATIONS

PCT International Application No. PCT/KR2019/010028, International Search Report dated Dec. 4, 2019, 21 pages.
(Continued)

*Primary Examiner* — Peter P Chau
(74) *Attorney, Agent, or Firm* — LEE, HONG, DEGERMAN, KANG & WAIMEY

(57) ABSTRACT

Disclosed according to various embodiments are a method for transmitting a sidelink signal by a terminal in a wireless communication system supporting a sidelink, and an apparatus therefor. Disclosed are a method for transmitting a sidelink signal by a terminal and an apparatus therefor the method comprising the steps of: obtaining measurement information related to a state of a channel for each of a plurality of antenna units; determining a candidate resource excluding specific resources from among a plurality of resources included in a predetermined resource pool on the basis of the measurement information; and transmitting the sidelink signal in the candidate resource, wherein when the
(Continued)

measurement information is different among the plurality of antenna units, the specific resources are independently determined for each of the plurality of antenna units.

12 Claims, 24 Drawing Sheets

(51) Int. Cl.
   *H04W 24/08* (2009.01)
   *H04W 72/54* (2023.01)
   *H04W 92/18* (2009.01)

(58) Field of Classification Search
   CPC .. H04W 72/085; H04W 28/02; H04B 17/318; H04B 7/0404
   See application file for complete search history.

(56) References Cited

U.S. PATENT DOCUMENTS

2020/0187162 A1* 6/2020 Luo ..................... H04W 72/044
2020/0221423 A1* 7/2020 Wang ................ H04W 72/0453

OTHER PUBLICATIONS

Intel Corporation, "Physical Layer Aspects of Sidelink Carrier Aggregation for Mode-4 LTE V2V Communication," R1-1720031, 3GPP TSG RAN WG1 Meeting #91, Dec. 2017, 10 pages.
ZTE Corporation, "Discussion on latency reduction," R2-1804511, 3GPP TSG RAN WG2 Meeting #101bis, Apr. 2018, 5 pages.
Vivo, "Signaling of CBR-PPPP-TxConfigList parameters," R2-1804699, 3GPP TSG-RAN WG2 Meeting #101bis, Apr. 2018, 5 pages.
Intel Corporation, "Resource Selection Latency Reduction for LTE V2V Sidelink Communication," R1-1804691, 3GPP TSG RAN WG1 Meeting #92bis, Apr. 2018, 7 pages.

* cited by examiner

FIG. 5
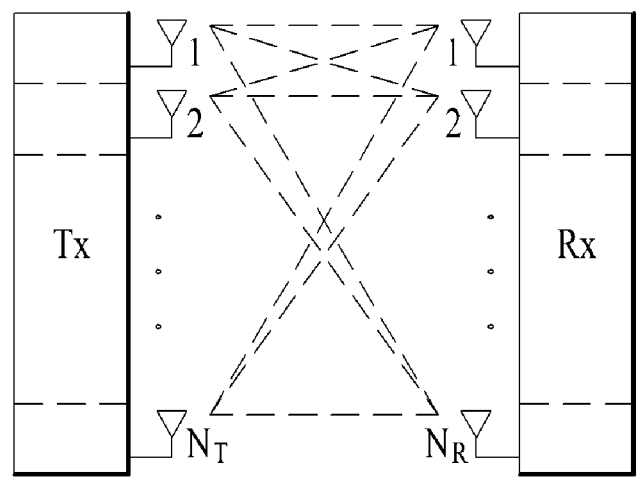
(a)
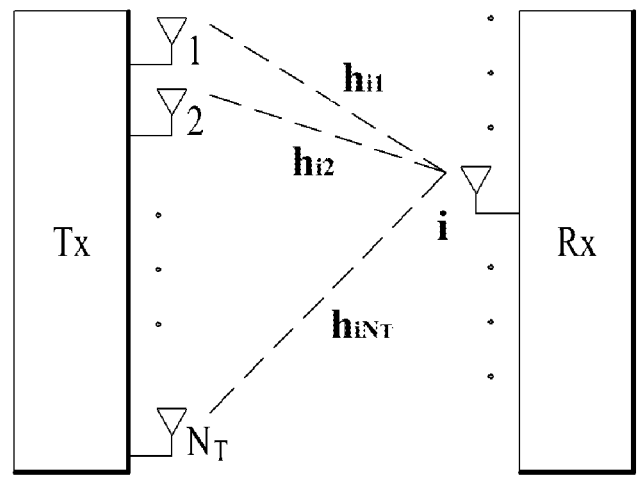
(b)

FIG. 8
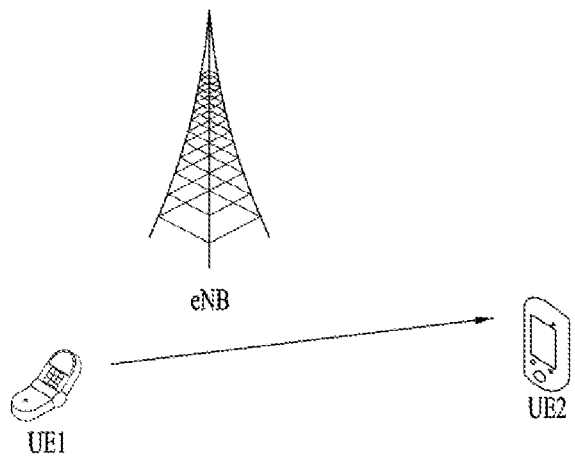
(a)
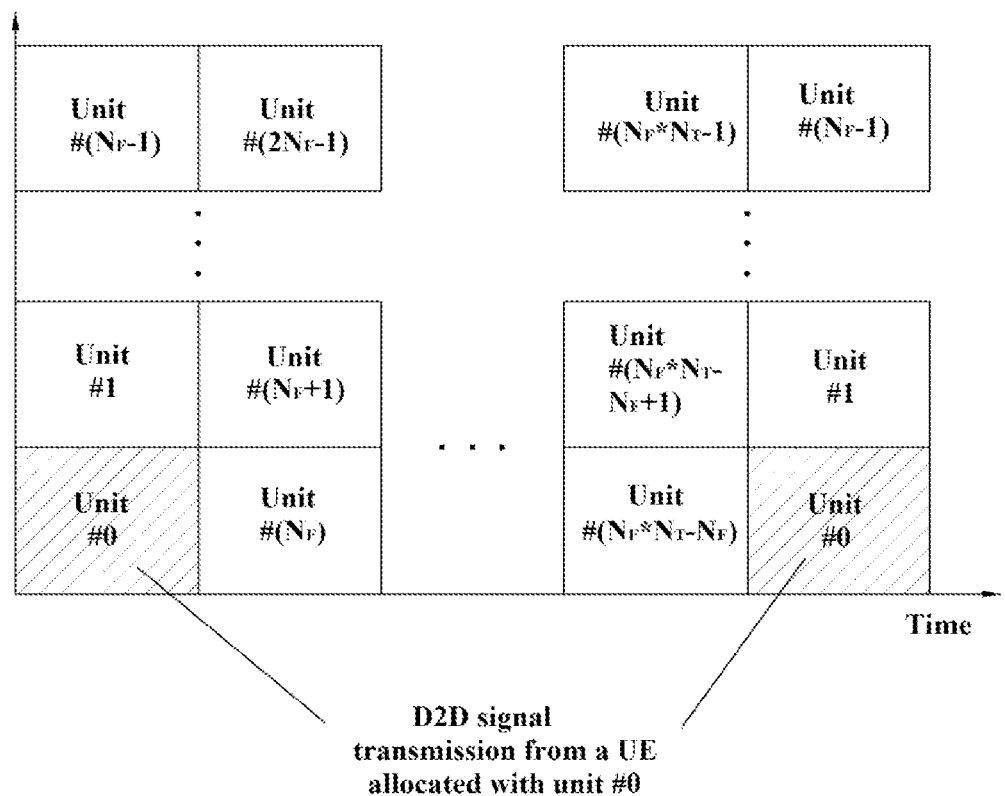
(b)

FIG. 9
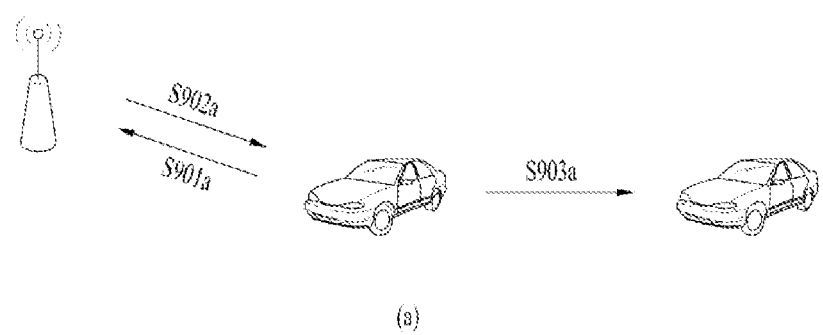
(a)
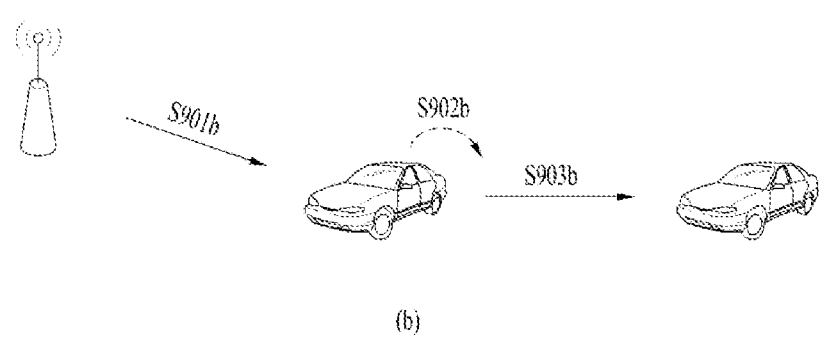
(b)

FIG. 15
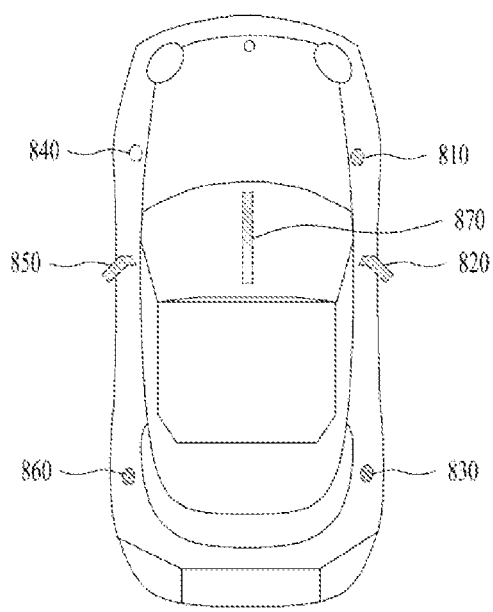
(a)
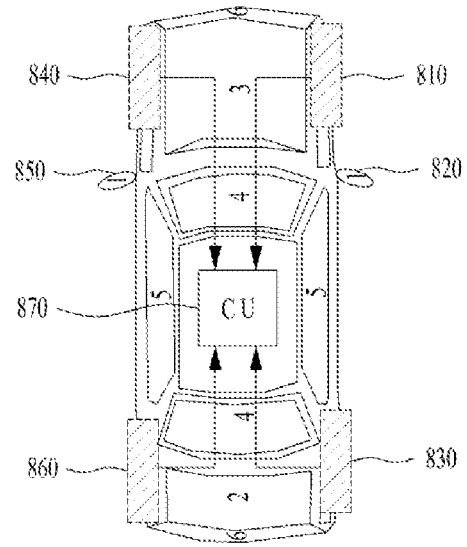
(b)

FIG. 18

| Frequency Range | scenario | Type 1 Delay (us) | Type 2 Delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

METHOD FOR TRANSMITTING SIDELINK SIGNAL BY TERMINAL IN WIRELESS COMMUNICATION SYSTEM SUPPORTING SIDELINK AND APPARATUS THEREFOR

CROSS-REFERENCE TO RELATED APPLICATIONS

This application is the National Stage filing under 35 U.S.C. 371 of International Application No. PCT/KR2019/010028, filed on Aug. 8, 2019, which claims the benefit of U.S. Provisional Application No. 62/716,297, filed on Aug. 8, 2018, the contents of which is hereby incorporated by reference herein in its entirety.

TECHNICAL FIELD

The present disclosure relates to a method for transmitting a sidelink signal by a UE in a wireless communication system supporting a sidelink and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present disclosure is to provide a method for performing an operation for selecting or excluding resources by independently considering a channel state of each of antenna panels.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for transmitting a sidelink signal by a UE in a wireless communication system supporting a sidelink comprises the steps of acquiring measurement information related to a state of a channel for each of a plurality of antenna units, determining candidate resources excluding specific resources from a plurality of resources included in a preconfigured resource pool on the basis of the measurement information, and transmitting the sidelink signal from the candidate resources, wherein the specific resources are independently determined for each of the plurality of antenna units when the measurement information is different among the plurality of antenna units.

The measurement information includes at least one measurement value of RSSI (Received Signal Strength Indicator) and RSRP (Reference Signal Received Power) for receiving strengths of signals measured for the plurality of resources.

The specific resources are determined by resources in which the RSRP greater than a predetermined threshold value is measured, among the plurality of resources.

When a ratio of the candidate resources to the plurality of resources is less than a preset ratio, the candidate resources additionally include at least one selected from the specific resources, and the at least one specific resource is selected based on an overlap ratio of the specific resources among the plurality of antenna units.

When a ratio of the candidate resources to the plurality of resources is less than a preset ratio, the candidate resources additionally include at least one of the determined specific resources, and the at least one specific resource is a specific resource, which is not overlapped among the plurality of antenna units, among the determined specific resources.

When a ratio of the candidate resources to the plurality of resources is less than a preset ratio, the specific resources are re-determined based on the predetermined threshold value which is changed.

The predetermined threshold value is adjusted until the ratio of the candidate resources to the plurality of resources reaches a preset ratio or more.

The measurement information includes a measurement value for a CBR (Channel Busy Ratio) for the channel.

The transmission parameters related to the sidelink signal are determined based on one CBR value selected in accordance with a preset reference, among the measurement CBR values.

The transmission parameters are configured differently per combination of the selected one CBR and traffic priority related to the sidelink signal.

The transmission parameters include at least one of a maximum transmission power related to congestion control of the channel, retransmission times per transport block (TB), a resource block size of a PSSCH (Physical Sidelink Shared Channel), MCS (Modulation Coding Scheme) level and a CR limit value (Channel Occupancy Ratio Limit).

The method further comprises the step of selecting information on at least one of the plurality of antenna units and the measurement information acquired for the at least one antenna unit and reporting the selected information to a higher layer.

The information on the at least one antenna unit, which will be reported to the higher layer, is selected from the plurality of antenna units on the basis of strengths of signals received in a preconfigured resource region.

In the case that the sidelink signal is transmitted from a specific one of the plurality of antenna units, the specific resources are determined based on the measurement information measured for the specific antenna unit.

In the case that each of a plurality of sidelink signals is transmitted from each of the plurality of antenna units, the candidate resources are independently determined by varying a time domain for each of the plurality of antenna units or determined by depending on candidate resources for a specific one of the plurality of antenna units.

The specific antenna unit is determined based on traffic priority or traffic reliability for each of the plurality of sidelink signals.

Each of the plurality of antenna units corresponds to any one of antenna panel, antenna port, TXRU (Transceiver Unit), antenna element and beam.

The plurality of antenna units are mutually distributed and disposed to acquire variety of transmission and reception directions through physical distribution among the antenna units.

In another aspect of the present disclosure, a device for transmitting a sidelink signal in a wireless communication system supporting a sidelink comprises a transceiver, a processor for controlling the transceiver, and a memory for storing a program for an operation of the processor, wherein the processor acquires measurement information related to a state of a channel for each of a plurality of antenna units on the basis of the program stored in the memory, determines candidate resources excluding specific resources from a plurality of resources included in a preconfigured resource pool on the basis of the measurement information, and transmits the sidelink signal from the candidate resources, and the specific resources are independently determined for each of the plurality of antenna units when the measurement information is different among the plurality of antenna units.

The processor receives a user input and switches a driving mode of a vehicle related to the device from an autonomous driving mode to a manual driving mode or vice versa.

Advantageous Effects

According to various embodiments of the present disclosure, an operation for selecting or excluding resources may be performed by independently considering a channel state of each of antenna panels, whereby a resource having an optimal channel state per antenna panel may be selected to make sure of signal transmission of improved quality.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas:

FIG. 8 is a view illustrating an exemplary D2D resource pool for D2D communication:

FIG. 9 is a view illustrating transmission modes and scheduling schemes for vehicle-to-everything (V2X):

FIG. 15 is a view illustrating a vehicle that includes a distributed antenna panel in accordance with one embodiment of the present disclosure;

FIGS. 17 and 18 are views illustrating an operation related to BWP switching latency:

BEST MODE FOR CARRYING OUT THE INVENTION

Figure 1:
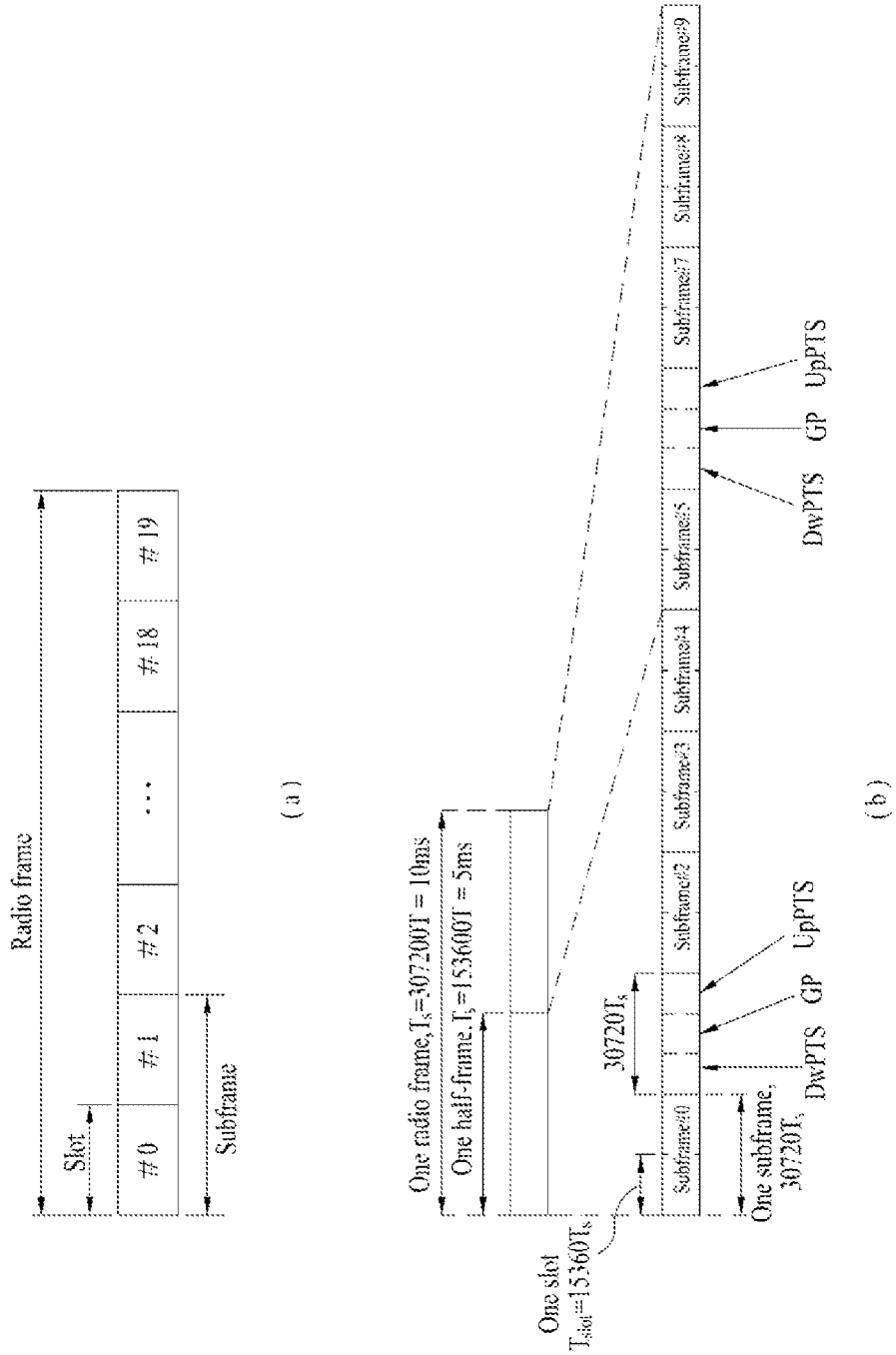
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below:

In a cellular orthogonal frequency-division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example 6 OFDM symbols may be included in one slot. If channel state gets poor for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
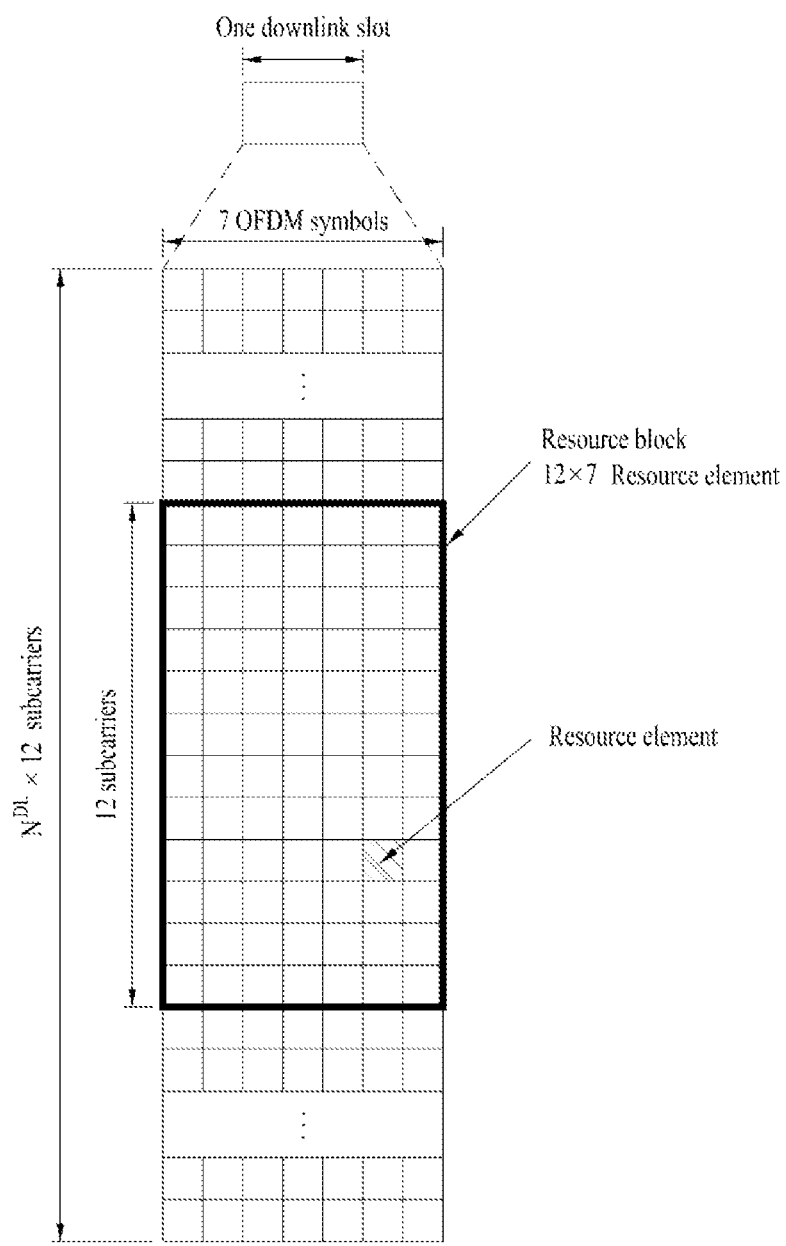
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot. NDL depends on a downlink transmission bandwidth. An uplink slot may have the same structure as a downlink slot.

Figure 3:
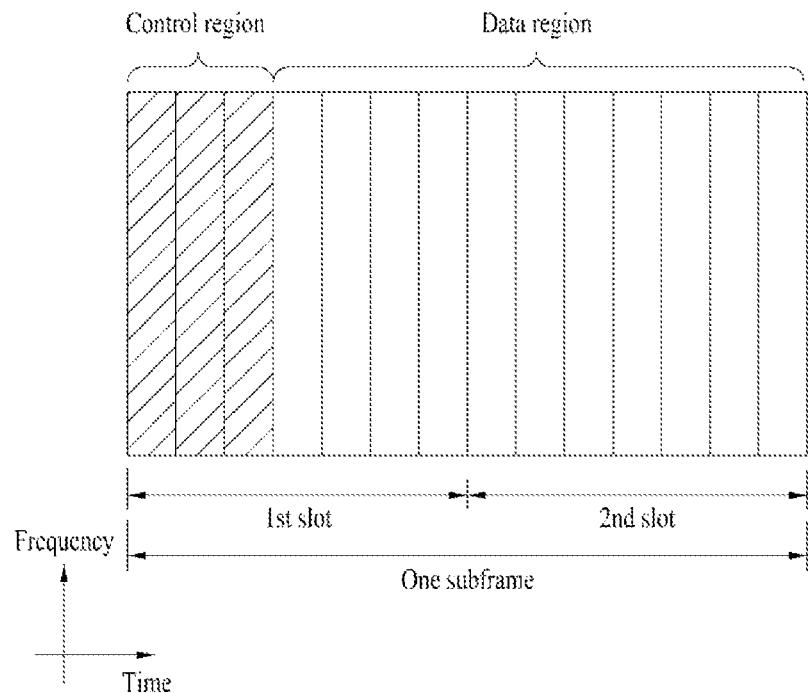
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VOIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
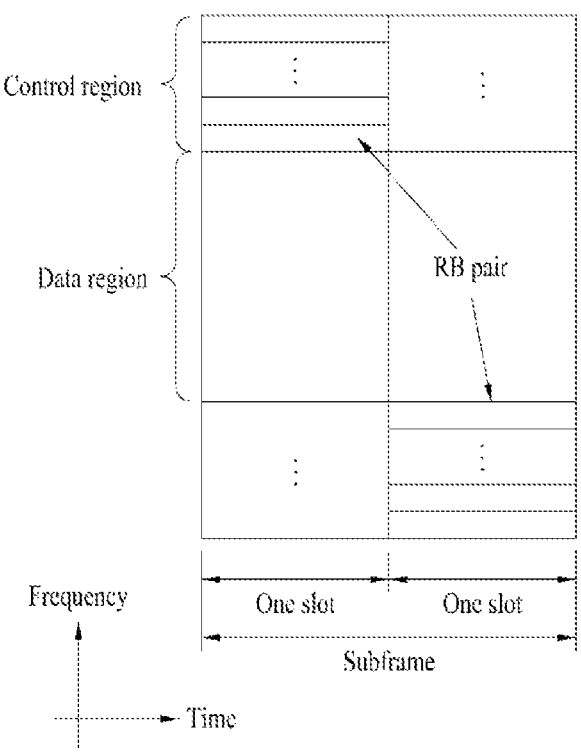
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
  i) Demodulation-reference signal (DM-RS) used for channel estimation for coherent demodulation of information delivered on a PUSCH and a PUCCH; and
  ii) Sounding reference signal (SRS) used for an eNB or a network to measure the quality of an uplink channel in a different frequency.

The downlink RSs are categorized into:
  i) Cell-specific reference signal (CRS) shared among all UEs of a cell;
  ii) UE-specific RS dedicated to a specific UE;
  iii) DM-RS used for coherent demodulation of a PDSCH, when the PDSCH is transmitted;
  iv) Channel state information-reference signal (CSI-RS) carrying CSI, when downlink DM-RSs are transmitted;
  v) Multimedia broadcast single frequency network (MBSFN) RS used for coherent demodulation of a signal transmitted in MBSFN mode: and
  vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}] \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, S can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \qquad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now; a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
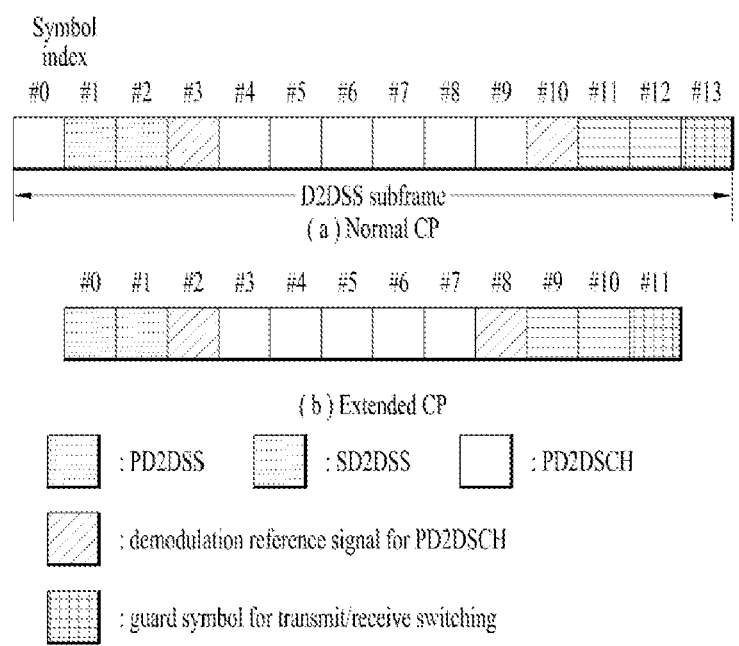
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a downlink (DL) primary synchronization signal (PSS), the PD2DSS may use a different Zadoff-Chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike the DL PSS/SSS (secondary synchronization signal), the PD2DSS/SD2DSS follows an uplink (UL) subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
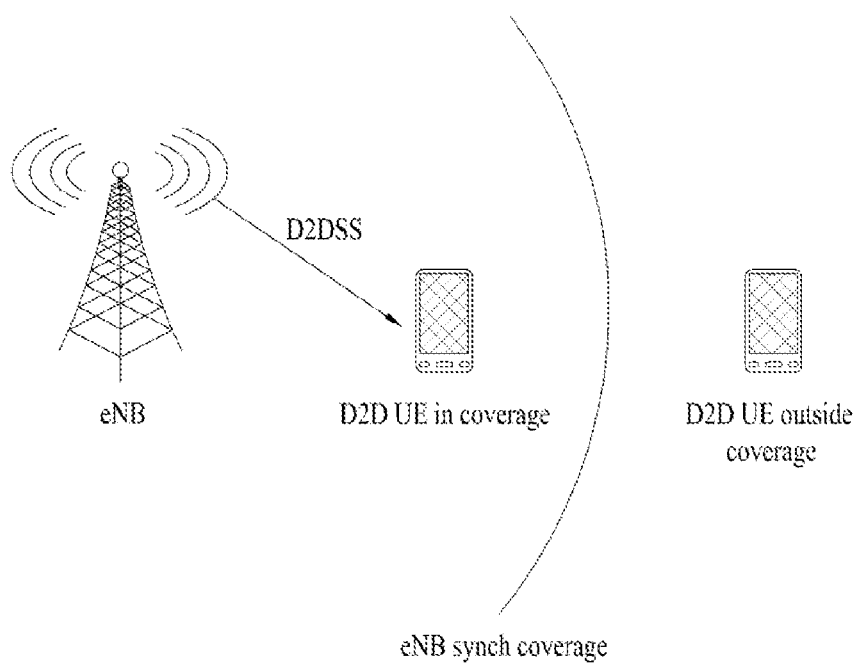
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool.

For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or physical sidelink shared channel (PSSCH)) corresponds to a resource pool used by a transmitting UE to transmit user data. If an SA and a D2D data are transmitted in a manner of being multiplexed in an identical resource unit. D2D data channel except SA information can be transmitted only in a resource pool for the D2D data channel. In other word. REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
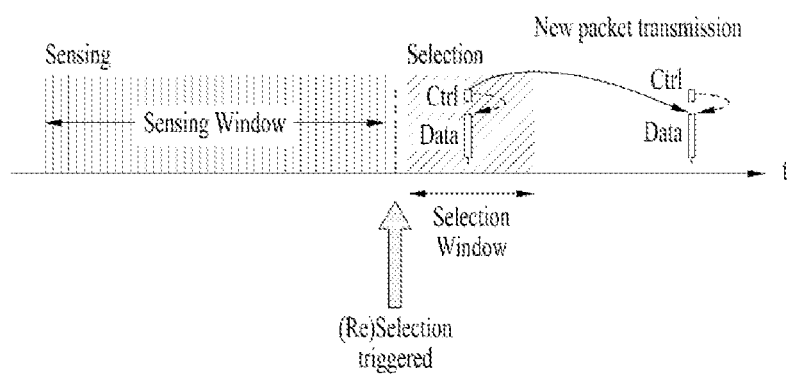
FIG. 10 is a view illustrating a method of selecting resources in V2X.
Figure 11:
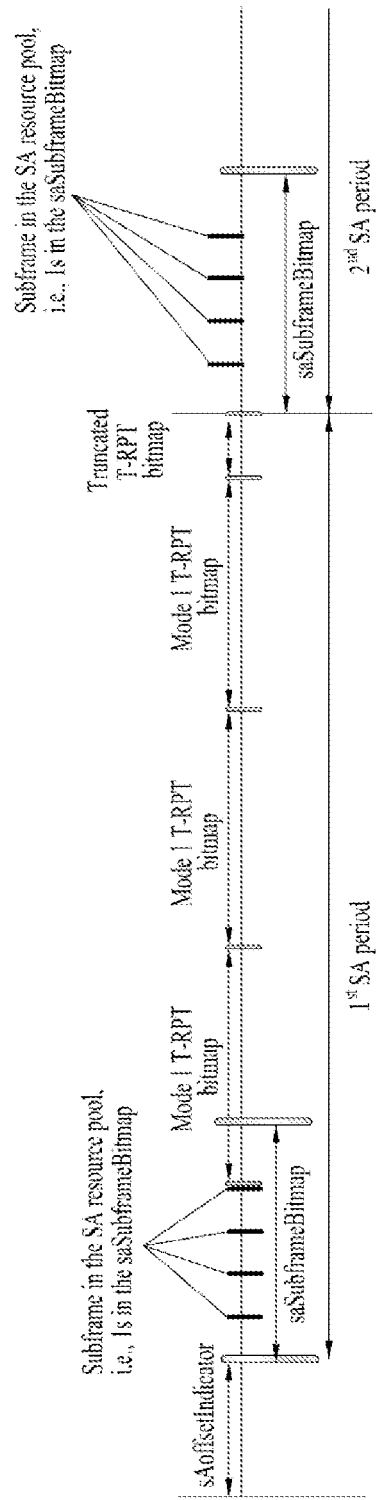
FIG. 11 is a view illustrating scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9), in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1s in a T-RPT bitmap, and one MAC PDU is transmitted four times.

Figure 12:
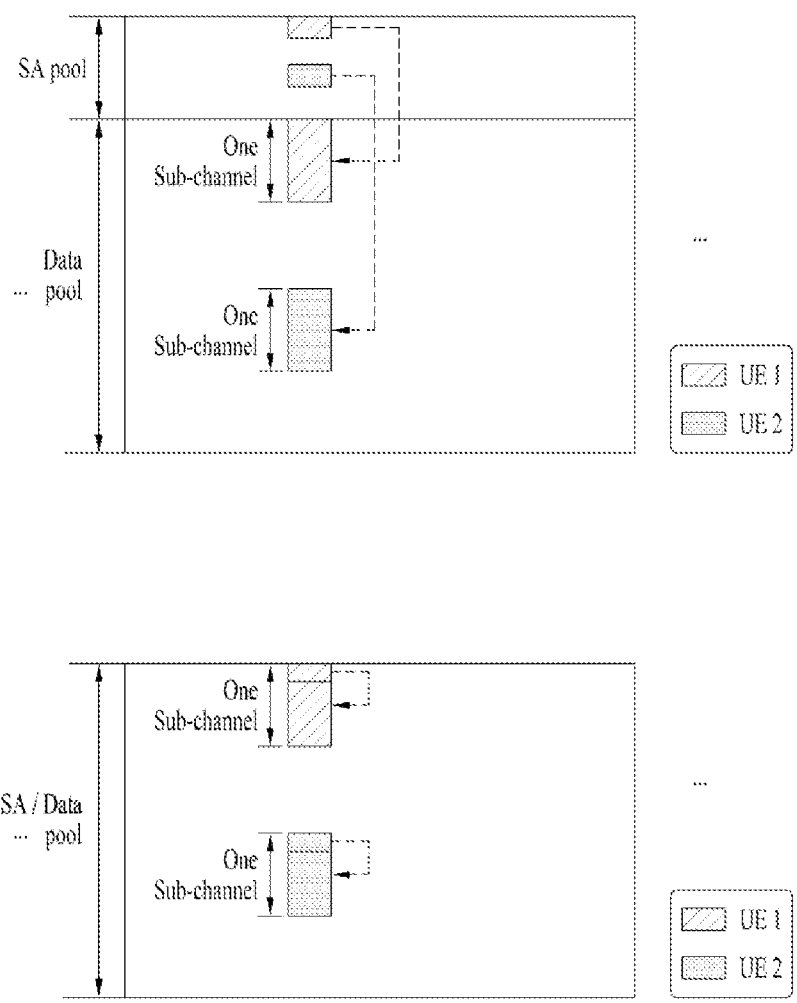
FIG. 12 is a view illustrating SA and data transmission in V2X.

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other or may be contiguous to each other. Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
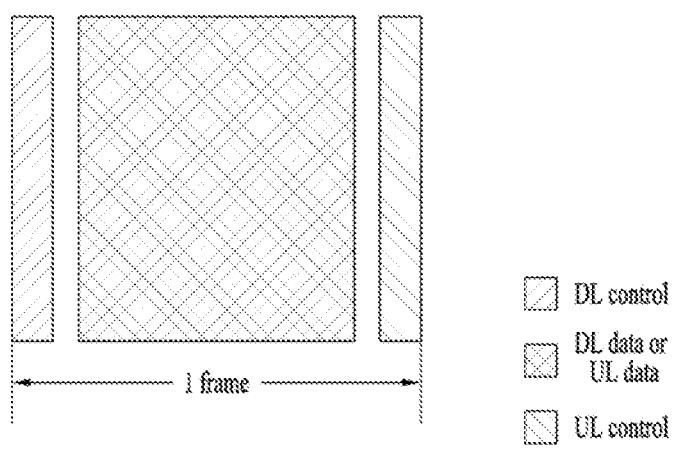
FIGS. 13 and 14 are views illustrating a new radio access technology (NRAT) frame structure.
Figure 14:
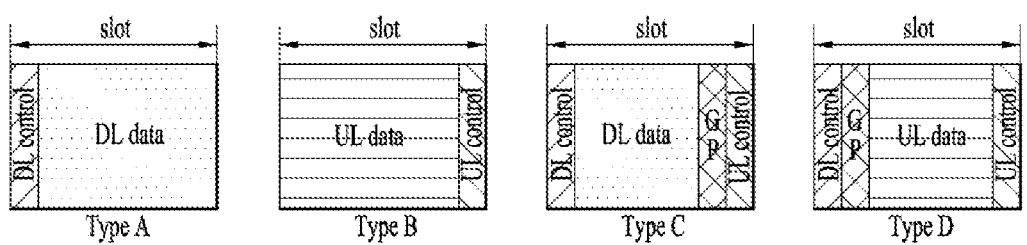

FIGS. 13 and 14 illustrate an exemplary frame structure available for NR. Referring to FIG. 13, the frame structure is characterized by a self-contained structure in which all of a DL control channel. DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Distributed Antenna Units (DUs)

FIG. 15 is a diagram illustrating a vehicle equipped with distributed antenna panels according to an embodiment of the present disclosure. The above-described wireless communication system is used more frequently in a wider range of services. Unlike the existing static services, there is a growing need to support high quality of service (Qos) along with a high data throughput or a high data rate to a UE or a user moving at a high speed.

However, the existing wireless communication systems may have limitations in providing services to a UE in consideration of fast movement or mobility. To support the services, a system network needs to be improved to the level of revolution. Further, it may be necessary to design a new system within a range that does not affect the existing network infrastructure, while maintaining compatibility with the existing network infrastructure.

For example, a plurality of antenna panels (beams, antenna ports, transceiver units (TXRUs), or antenna elements) may be installed in a vehicle related to a UE, so that a service may be supported for the UE during fast movement. In the vehicle, a central unit (CU) may collect data received at each of the plurality of antenna panels or information for channel state measurement from each of the plurality of antenna panels. For this operation, a MIMO system between vehicles may be considered. When a plurality of antenna panels (beams, antenna ports, TXRUs, or antenna elements) are used as described above, the vehicle may prevent the degradation of communication performance caused by a transmission loss having an average value of about 20 dB. In addition, the vehicle may be equipped with a plurality of antenna panels (beams, antenna ports, TXRUs, and or antenna elements) attached thereto, and achieve reception diversity by spacing Rx antennas from each other. That is, it may be possible to provide a service to a UE during fast movement through the above-described inter-vehicle MIMO system, without an additional design for a network.

However, despite the above-described advantages, it is difficult to apply an inter-vehicle MIMO system for such reasons as appearance of the vehicle and construction of a manufacturing system. Moreover, the vehicle is considerably expensive compared to the existing personal portable communication devices, and is not easily improved or updated. Further, since a vehicle is equipment that should satisfy more requirements such as design concept, aerodynamic structure, and so on as well as communication performance, vehicle designs may be limited for aesthetic/aerodynamic reasons. For example, some vehicle manufacturers use a combination antenna, which is inferior in performance to a single antenna, in order to eliminate visual discomfort brought by an existing antenna.

However, to overcome the spatial constraints of large-scale antenna arrays in an environment requiring the development of communication systems, the installation of a distributed antenna array system for implementing a multi-antenna array system in a vehicle has been introduced and applied in consideration of harmony with the exterior of the vehicle.

Referring to FIG. 15, for example, a vehicle may be equipped with a plurality of antenna panels 810, 820, 830, 840, 850, and 860. The positions and number of the antenna panels 810, 820, 830, 840, 850, and 860 may vary depending on a vehicle design system and each individual vehicle. The configuration described below may be applied irrespective of the positions and number of the antenna panels 810, 820, 830, 840, 850, and 860, and the present disclosure is not limited to the following embodiment. That is, the configuration is applicable to antennas deployed in various shapes and radiation patterns according to the positions of the antenna panels 810, 820, 830, 840, 850, and 860.

A CU 870 may control signals for the antenna panels distributed in the vehicle. That is, the CU 870 of the vehicle may control signals to the plurality of antenna panels 810, 820, 830, 840, 850, and 860 installed in the vehicle to receive signals from a BS or other UEs, while maximizing reception diversity, and may prevent wireless disconnection from the BS or UEs during high-speed movement. That is, the vehicle itself may serve as one UE or a relay UE that relays signals, which has a plurality of antenna panels. The vehicle may provide a quality service to a plurality of UEs in the vehicle through control and relaying of received signals through the CU 870.

When wireless communication (or sidelink communication) is conducted through the plurality of antenna panels 810, 820, 830, 840, 850, 860 as described above, channel state information (e.g., a received signal strength indicator (RSSI), a reference signal received quality (RSRQ), a channel busy ratio (CBR), or a channel occupancy ratio) measured in specific resources may be different for each antenna panel. Specifically, the sensing (or/and measurement) results of the antenna panels (beams, antenna ports, TXRUs, or antenna elements) may be different due to self-blocking of the body of the UE (or vehicle), reflection between UEs (or vehicles), the angles of surfaces on which the antenna panels (beams, antenna ports, TXRUs, or antenna elements) are mounted, different radiation patterns, beamforming gains, or antenna gains due to different positions, or formation of beam directionalities. For example, for a vehicle at a specific location, the presence or absence of vehicle blockage may be determined differently for each antenna panel (beam, antenna port, TXRU or antenna element) at a different position. In this case, the UE needs to determine reference information of measurement information measured differently per antenna panel to control congestion, configure transmission parameters and select transmission resources.

Hereinafter, a method for independently measuring channel measurement information per antenna panel (or beam, AP, TXRU or antenna element), a method for determining measurement information, which is a reference for congestion control or determination of transmission parameters, among various kinds of measurement information which are measured, and a method for selecting transmission resources for mode 4 (mode for directly scheduling transmission resources of a UE within a preconfigured resource pool by the UE) on the basis of the measured measurement information will be described.

Resource Management for V2X with Consideration for Distributed Antenna

When a plurality of antenna panels (or beams, antenna ports (APs), transceiver unit (TXRUs) or antenna elements) are used for acquisition of (transmission/reception) coverage of V2X communication, a resource management method (for example, sensing and resource selection, load control, antenna panel (or beam. TXRU. AP or antenna element) selection) will be proposed. In this case, the beam may include a beam for a baseband terminal (or digital beam) or RF terminal (or analog beam). The TXRU may be a unit having a phase shifter and an amplifier, which are related to analog beam control. Also, for example, some or all of different antenna panels (or beams. APs. TXRUs, antenna elements) within one UE (for example, vehicle) may be located at different positions. For example, link quality (/channel state), beamforming gain (/antenna gain) (or beam (bore sight) orientation), etc. may be different per antenna panels (or beams. APs. TXRUs, antenna elements) located at different positions.

Otherwise. V2X communication mode may be categorized into (1) a mode for signaling (or controlling) scheduling information related to V2X message transmission (or reception) on a V2X resource pool previously configured or signaled from the BS or the network, which is MODE #3, by means of a BS, and/or (2) a mode for directly determining or controlling scheduling information related to V2X message transmission (or reception) on a V2X resource pool previously configured or signaled from the BS or the network, which is MODE #4, by means of the UE. In this case, the UE located in communication coverage of the BS and/or the UE of RRC_CONNEECTED state may be set to the MODE #3, or the UE located outside communication coverage of the BS and/or the UE of IDLE state may be set to the MODE #4. Meanwhile, the MODE #4 may be set to even the UE located in communication coverage of the BS and/or the UE of the RRC_CONNECTED state.

For example, the term "sensing operation" may be interpreted as an operation of measuring PSSCH-RSRP based on a PSSCH-DMRS sequence scheduled by a successfully decoded PSCCH and/or an operation of measuring S-RSSI based on a V2X resource pool-related subchannel (see Table 2) in the present disclosure. The term "reception" may be interpreted (or extended) as at least one of (1) a V2X channel (or signal) decoding (or reception) operation and/or a WAN DL channel (or signal) decoding (or reception) operation, and/or (2) a sensing operation, and/or (3) a CBR measurement operation in the present disclosure. The V2X channel may include the PSCCH, the PSSCH the PSBCH, and the PSSS/SSSS, and the WAN DL channel may include the PDCCH, the PDSCH, and the PSS/SSS.

In addition, the term "transmission" may be interpreted (or extended) as a V2X channel (or signal) transmission operation and/or a WAN UL channel (or signal) transmission operation in the present disclosure. The V2X channel may include the PSCCH, the PSSCH, the PSBCH, and the PSSS/SSSS, and the WAN DL channel may include the PUSCH, the PUCCH, and the SRS in the present disclosure. The term "synchronization signal (SS)" may be interpreted (or extended) as including "PSBCH" as well as "SLSS" in the present disclosure.

Table 1 describes an exemplary definition of a BWP and/or a carrier.

TABLE 1

Definition of bandwidth part

A contiguous set of PRBs in a given numerology

Motivation of bandwidth part

Energy saving by using RF switching
Load balancing among different bandwidth part
A single cell can support multiple UEs with different capability in terms of system bandwidth size TABLE 1-continued Forward compatibility for potential extension of
system bandwidth sizes Bandwidth part in Rel-15

Figure 16:
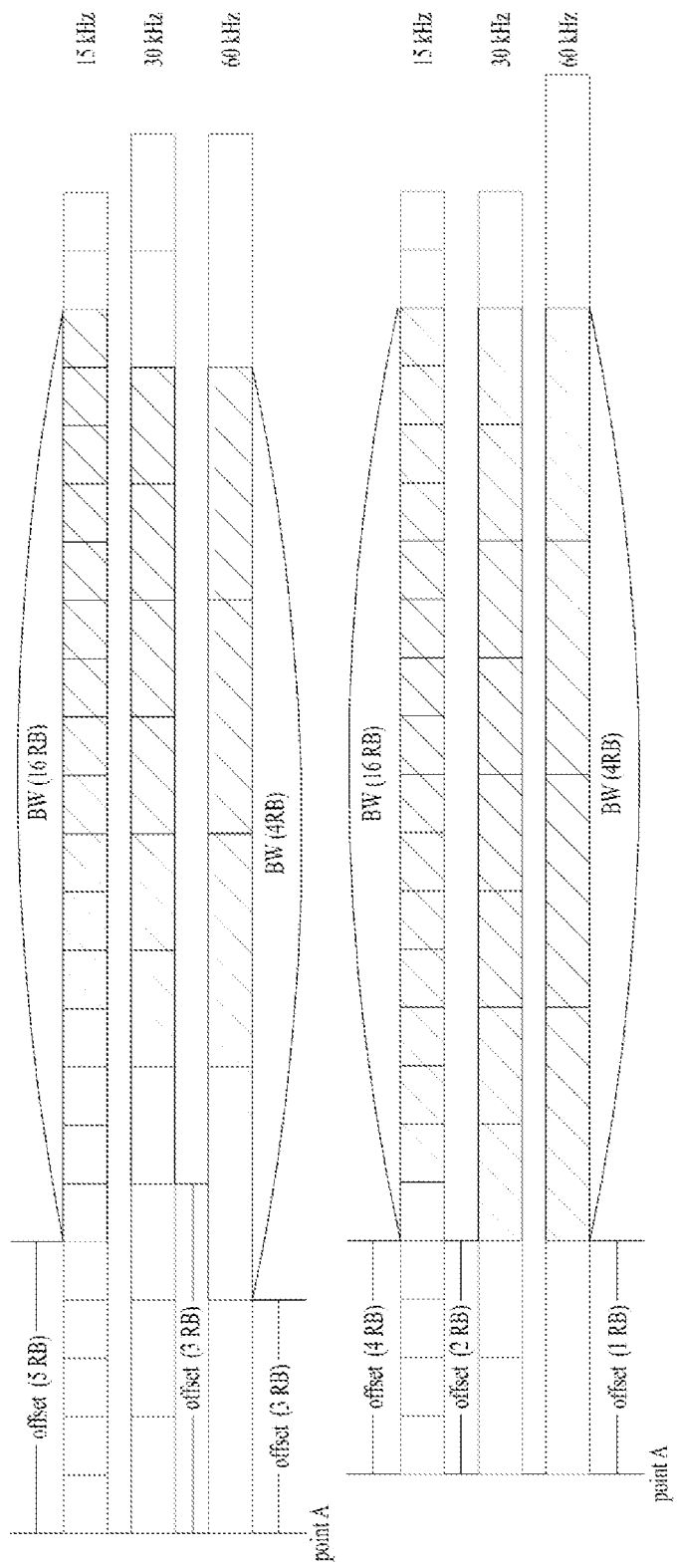
FIG. 16 is a view illustrating definition of a carrier in the present disclosure.

A UE can support only one active DL BWP at a time
for DL carrier in a cell
A UE can support at most one active UL BWP in UL or
UL and SUL or SUL only depending on SUL configuration
   In case SUL is not configured, at most one in UL carrier
   corresponding to the DL carrier
   In case SUL with dynamic switching is configured, at
   most one in each UL and SUL
   In case SUL is only used, at most one in SUL carrier
A UE expects the same numerology between
DL BWP and UL BWP at the same time
in a given cell except for UL BWP in SUL carrier
   SUL carrier can support different numerology from
   DL carrier in the cell
   The numerology is however smaller or equal to that of DL carrier
A UE is configured or accessed initial DL/UL BWP for each cell
   Initial DL/UL BWP defines the first BWP that the
   UE access in a given cell
   In PCell, initial DL/UL BWP is defined by
   SSB & RMSI configuration
   In other cell, initial DL/UL BWP can be configured Definition of carrier (See FIG. 16)

Figure 17:
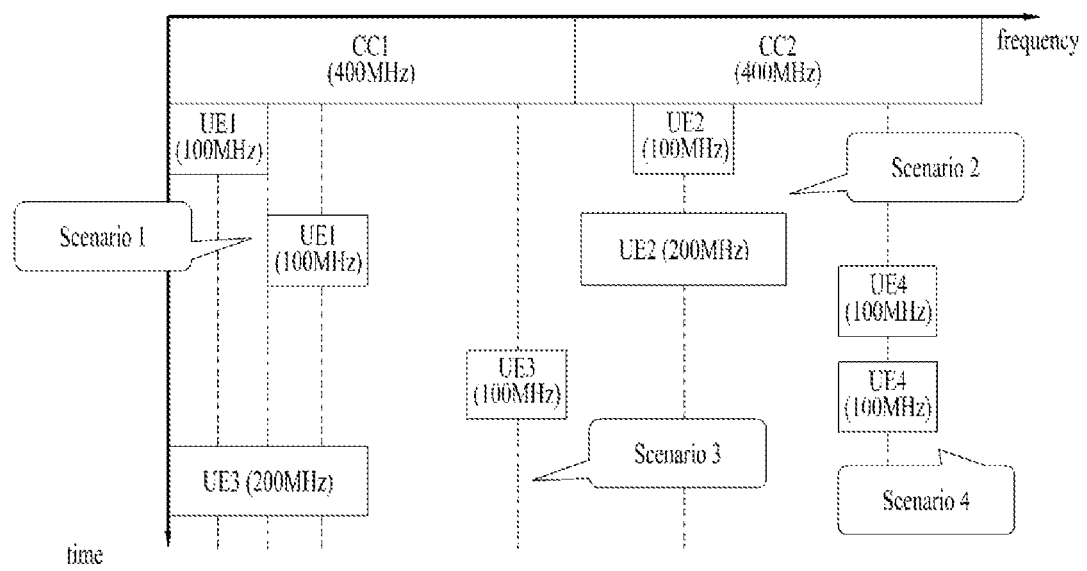

Center frequency and bandwidth
   Subcarrier spacing(s) supported by the carrier are
   also indicated for a given carrier
   Parameters configured in each cell/carrier includes
      Point A: Reference point outside of carrier's PRBs
      where subcarrier 0 of all numerologies (supported by
      the network in that carrier) are aligned
      Offset between point A and lowest subcarrier for a given
      subcarrier spacing: the lowest frequency of PRBs of the given
      numerology (in RBs based on the given numerology)
      Bandwidth in # of RBs: bandwidth of the given numerology PRBs Relationship between carrier and bandwidth part Configurations done at carrier level
      PRB grid of each numerology supported by the carrier
      BWP configurations (up to 4) in that carrier (DL/UL separate)
      CBG configuration
      TPC (per cell group)
      HARQ process
      Scrambling/sequence related parameters
   Configurations done at BWP level
      Control resource set (configured per cell, but association per BWP)
      Resource allocation related parameters (T/F) & DM-RS config
      CSI-RS related parameters
      SRS resource set
      HARQ-ACK & SR resource
      Configured UL grant BWP Switching latency (See FIGS. 17 and 18)

Type 4 UE-capability to indicate between Type1 and Type2
delay that the UE supports
Scenario 4 does not require 'RF component latency'

Active Bandwidth part

UE is not required to monitor the downlink radio link quality in
DL BWPs other than the active DL BWP on the primary cell
UE is not expected to receive PDCCH, PDSCH, or CSI-RS
(except for RRM) outside an active DL BWP
UE is not expected to be triggered with a CSI report
for a non-active DL BWP
UE is not expected to transmit PUCCH, or PUSCH
outside an active UL BWP
For a given time, a single BWP is active per link (DL/UL/SUL) per cell
DCI format 1_1 and DCI format 0_1 can have
bandwidth part indicator for dynamic
change of DL/UL BWP for PDSCH/PUSCH transmission
   For each DCI field, the bit field size is determined
   based on the active DL
BWP where PDCCH is transmitted, and the
interpretation is based on the
BWP indicated by DCI format 1_1 or 0_1

Initial Bandwidth part

For DL, initial BWP is given by consecutive RB sets for
RMSI CORESET (which is configured by PBCH)
Subcarrier spacing,
CP length,
For UL, initial BWP is given by SIB for random access procedure Default Bandwidth part Default DL bandwidth part is higher layer configured
Initial value of default bandwidth part is initial DL bandwidth part
For energy saving, UE will switch its active bandwidth
part to default bandwidth part when UE does not detect DCI
format 1_1 or DCI format 0_1 for a certain duration of
time (based on BWP-Inactivity Timer)

Table 2 describes an exemplary definition of S-RSRP and/or S_RSSI and/or CBR and/or CR.

TABLE 2

| 5.1.28 Sidelink Received Signal Strength Indicator (S-RSSI) | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0,1, . . . , 5 of the second slot of a subframe The reference point for the S-RSSI shall be the antenna connector of the UE. If receiver diversity is in use by the UE, the reported value shall not be lower than the corresponding S-RSSI of any of the individual diversity branches |
| Applicable for | RRC_IDLE intra-frequency, RRC_IDLE inter-frequency, RRC_CONNECTED intra-frequency, RRC_CONNECTED inter-frequency |
| 5.1.29 PSSCH Reference Signal Received Power (PSSCH-RSRP) | |
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH. The reference point for the PSSCH-RSRP shall be the antenna connector of the UE. If receiver diversity is in use by the UE, the reported value shall not be lower than the corresponding PSSCH-RSRP of any of the individual diversity branches |
| Applicable for | RRC_IDLE intra-frequency, RRC_IDLE inter-frequency, RRC_CONNECTED intra-frequency, RRC_CONNECTED inter-frequency |
| NOTE: The power per resource element is determined from the energy received during the useful part of the symbol, excluding the CP. | |
| 5.1.30 Channel busy ratio (CBR) | |
| Definition | Channel busy ratio (CBR) measured in subframe n is defined as follows: For PSSCH, the portion of sub-channels in the resource pool whose S- |

TABLE 2-continued

| Applicable for | RSSI measured by the UE exceed a (pre-)configured threshold sensed over subframes [n-100, n-1]; For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n-100, n-1], assuming that the PSCCH pool is composed of resources with a size of two consecutive PRB pairs in the frequency domain. RRC_IDLE intra-frequency, RRC_IDLE inter-frequency, RRC_CONNECTED intra-frequency, RRC_CONNECTED inter-frequency |
|---|---|

NOTE:
The subframe index is based on physical subframe index

5.1.31 Channel occupancy ratio (CR)

| Definition | Channel occupancy ratio (CR) evaluated at subframe n is defined as the total number of sub-channels used for its transmissions in subframes [n-a, n-1] and granted in subframes [n, n + b] divided by the total number of configured sub-channels in the transmission pool over [n-a, n + b]. |
|---|---|
| Applicable for | RRC_IDLE intra-frequency, RRC_IDLE inter-frequency, RRC_CONNECTED intra-frequency, RRC_CONNECTED inter-frequency |

NOTE 1:
a is a positive integer and b is 0 or a positive integer; a and b are determined by UE implementation with a + b + 1 = 1000, a >= 500, and n + b should not exceed the last transmission opportunity of the grant for the current transmission.
NOTE 2:
CR is evaluated for each (re)transmission.
NOTE 3:
In evaluating CR, the UE shall assume the transmission parameter used at subframe n is reused according to the existing grant(s) in subframes [n + 1, n + b] without packet dropping.
NOTE 4:
The subframe index is based on physical subframe index.
NOTE 5:
CR can be computed per priority level Table 3 below describes an exemplary beam failure recovery (BFR), radio link monitoring (RLM), and/or L3 measurement (or radio resource management (RRM)) procedure.

TABLE 3

Beam failure recovery
  ✓ Motivation
    Frequent radio link failure can be occurred in FR2 operation due to the analog beamforming based communication
      A serving beam pair is vulnerable to UE mobility, UE rotation, or beam blockage
      Radio link recovery takes too long time until the link is successfully recovered
      If UE can find a new beam based on periodic DL RS measurement, the link can be quickly recovered via changing the serving beam
    Define a new L1/L2 based fast link recovery procedure (UE-initiated serving beam change)
  ✓ Overall procedure
    Beam failure detection
      UE finds out whether serving DL beam is failed or not
    New beam identification
      UE finds out a new beam based on beam RS strength and selects an associated PRACH preamble
    BFRQ(beam failure recovery request) & monitoring response from gNB
      UE transmits the selected PRACH and searches for gNB's response
  ✓ Beam failure detection
    A beam failure instance
      When BLERs of all serving beams are above a threshold($Q_{out}$), it is called as a beam failure instance (BFI)
      For 'serving beam' RS determination,
        » Option1: No explicit configuration of failure-detection-RS
          All of the CORESET beam RSs (CSI-RS or SS/PBCH block) are monitored
        » Option2: Explicit configuration of failure-detection-RS
          The configured RS(s) are monitored
          Only periodic CSI-RS with single port is allowed to be configured
      PHY reports BFI to MAC sublayer periodically
        » No BFI indication if the BLER is below the threshold ($Q_{out}$)
        » The indication interval is determined by the shortest periodicity of failure-detection-RSs
        » The interval is lower bounded by 2 msec
    'Bam failure' is declared if N BFIs are occurred, where consecutive BFIs should be occurred within a timer.
      If no BFI is received during M reporting intervals, MAC resets the BFI count.
      The value of N (max. BFD count) and M (BFD timer) are configured by RRC.

TABLE 3-continued

- ✓ New beam identification and PRACH Tx
    - NW can configure a list of new candidate beam RSs and a list of associated contention-free (CF) PRACH resources to a UE by RRC
        - Case1(1-1 mapping): a CF PRACH - an SSB ID
        - Case2(1-1 mapping): a CF PRACH - a CSI-RS resource ID
        - Case3(1-1 mapping): a CF PRACH - either an SSB ID or a CSI-RS resource ID
        - Case4(1-X mapping): a CF PRACH - a SSB ID and sQCLed CSI-RS resource ID(s)
    - When beam failure event occurs, UE selects a beam RS (either SSB or CSI-RS) and transmits PRACH associated to the selected RS
        - When the new beam RS list is configured, UE searches for a new beam among the configured RSs first until a timer (Beam-failure-recovery-Timer) expires.
            - » If UE found at least one beam RS above a L1-RSRP threshold ($Q_{in}$),
                - UE selects one of the RS(s) and transmits CF PRACH mapped to the selected one
            - » Else, UE searches for all SSBs & selects one SSB among them, and then transmits contention-based PRACH associated to the selected SSB
                - If at least one SSB is above a L1-RSRP threshold, UE selects one of the SSB(s)
                - Else, UE selects any SSB
        - After the timer expiration, UE searches for a SSB and transmits contention-based PRACH associated to the SSB selected by UE
        - When the new beam RS list is not configured, UE searches for a SSB and transmits contention-based PRACH associated to the SSB selected by UE
    - If UE could not receive a response for the PRACH within a window, UE can select another new beam and can transmit the PRACH associated to the beam
    - UE stops the PRACH transmission if the number of PRACH transmissions reaches to the maximum number (PreambleTransMax-BFR) configured by RRC
- ✓ PRACH response monitoring
    - If gNB successfully detects the PRACH, it means that
        - The UE is in 'beam failure' and a new beam is found by the UE
        - The new beam ID or a set of potential new beam IDs is the one(s) associated to the PRACH
    - gNB can transmit a PDCCH as a response to the PRACH for BFRQ
        - For the response reception w.r.t. the CF PRACH,
            - » CRC of the PDCCH is scrambled by C-RNTI
            - » No restriction on the DCI format
            - » A dedicated search space for the response monitoring can be configured by RRC
            - » UE starts monitoring after 4 slots of the PRACH transmission
        - For the response reception w.r.t. the CB PRACH, existing search space & related parameters for initial access is reused
        - UE assumes that the PDCCH for BFRQ response is spatial QCL'ed with DL RS of the UE-selected new beam for the BFRQ L3 Measurement for mobility management
- ✓ Measurement resources for RRM measurement
    - LTE system
        - Common Reference Signal is defined as "Always-On" signal
        - CSI-RS within DMTC window (Small cell enhancement)
    - NR system
        - No "Always-On" reference signal
        - Multi-beam operation
- ✓ Measurement Resource for RRM measurement in NR
    - Measurement resource
        - SS/PBCH block: SSS and PBCH-DMRS
        - CSI-RS within active BWP (only in connected mode)
    - SS/PBCH block based measurement is baseline
        - SS/PBCH block: Always periodic transmission
        - CSI-RS: No self-synchronization property
- ✓ SMTC (SSB-based RRM measurement Timing configuration)
    - Similar to DMTC in LTE system
    - Network power saving vs. UE complexity
        - Long periodicity of SS/PBCH block for network power saving: maximum 160 ms
        - High complexity of neighbour cell detection in UE from long periodicity TABLE 3-continued UE power saving
    SS/PBCH blocks from neighbour cells are confined within the
        configured window
            » Configured window = SMTC
            » Comparable complexity of neighbour cell searcher to LTE
        system
    Measurement subset
        » Network configuration of subset of SS/PBCH blocks
Configuration
    SMTC window duration
    SMTC periodicity & timing offset
        » Multiple SMTC (periodicity) configuration:
        SMTC1/SMTC2
        » Common window duration and timing offset for SMTC1
        and SMT2
        » Cell list in SMTC2 in case of multiple periodicity
        configuration
✓ CSI-RS resources
    Why CSI-RS resources?
        Large number of transmission beam in a cell
        Lighter resources than SS/PBCH block
        More flexible resource configuration
    Associated SS/PBCH block & QCL
        UE is required to measure all configured CSI-RS resources
            » Large measurement capability & power consumption
        Associated SS/PBCH block for UE complexity reduction
            » UE measurement: Only when the associated SS/PBCH
            block is detected
            » QCL (Type-D) configuration with the associated SS/PBCH
            block resource
    Reference timing of CSI-RS Resource
        Associated SS/PBCH block: Timing of the detected cell
        No associated SS/PBCH block: Timing of the serving cell
✓ Measurement report
    Per-cell measurement report
        If absThreshSS-BlocksConsolidation is not configured or the highest
        beam measurement quantity value is below absThreshSS-
        BlocksConsolidation
            » Highest beam measurement quantity value
        else
            » The linear average of the power values of the highest beam
            measurement quantity values above absThreshSS-
            BlocksConsolidation where the total number of averaged
            beams shall not exceed nrofSS-BlocksToAverage
    Per-beam measurement report
✓ Per-beam measurement report
    Detection of SSB index for per-beam measurement report
        High UE complexity for extraction of SSB index from PBCH
    Synchronization indicator (UseServingCellTimingForSync)
        Use timing of one cell to derive the SSB index of another cell
            » Intra-frequency measurement: serving cell
            » Inter-frequency measurement: any detected cell
        In TDD bands, Synchronization indicator is assumed to be set to
        TRUE
✓ RSRP
    Used for Beam management and mobility (cell selection, reselection and
        handover)
    SS/PBCH block RSRP and CSI-RS RSRP
        SS-RSRP: linear average over the power contributions (in [W]) from
            SSS and PBCH DM-RS in Idle, inactive, connected mode
        CSI-RS RSRP: linear average over the power contributions (in [W])
            from CSI-RS in connected mode
✓ RSRQ
    Used for mobility (cell selection, reselection and handover)
    Secondary synchronization signal reference signal received quality (SS-
        RSRQ)

$$\frac{N \times SSB\ RSRP}{NR\ carrier\ RSSI},$$ where N is the number of RB's of the NR carrier RSSI measurement bandwidth.
    CSI reference signal received quality (CSI-RSRQ)

$$\frac{N \times CSI - RSRP}{CSI - RSSI},$$ where N is the number of resource blocks int he CSI-RSSI measurement bandwidth TABLE 3-continued ✓ RSSI
    Linear average of the total received power (in [W]) observed only in OFDM
        symbols of measurement time resource(s)
            Including co-channel serving and non-serving cells, adjacent channel
                interference, thermal noise etc.
    Measurement duration
        SS/PBCH block
            » Default configuration
                SS/PBCH block: Any OFDM symbols within
                SMTC window (UE implementation)
            » Network configuration
                Avoid UL part (and/or SS/PBCH block) for RSSI
                measurement in TDD band
                Measure over the indicated OFDM symbols of the
                indicated slots
        CSI-RS: OFDM symbol containing CSI-RS resources
✓ Rx beam for RSRQ measurement
    Same set of RX beams shall be used in measurement of each TX beam based
        on a measurement object
    Same Rx beam between RSRP measurement and RSSI measurement
Radio Link Monitoring for mobility management
✓ Overview
    Objective
        Detection of the downlink radio link failure (RLF) of the PCell and
            PSCell
        Periodic IS (In sync)/OOS (Out of sync) indication to RRC layer
        Radio link re-establishment after RLF
    Reference channel
        Same with LTE
        Hypothetical PDCCH (BLER)
    Measurement resources
        SS/PBCH block and/or CSI-RS
            » Explicit configuration from network
            » Default RLM-RS: RSs indicated by TCI state of
            CORESETs for monitoring PDCCH
        Configurable $Q_{in}/Q_{out}$ for service type (RAN4)
✓ Multiple beam operation in RLM
    Multiple RLM-RS configuration for multiple beam
    IS/OOS definition
        OOS: when the radio link quality is worse than the threshold $Q_{out}$ for
            all resources in the set of resources for radio link monitoring
        IS: when the radio link quality is better than the threshold $Q_{in}$ for any
            resource in the set of resources for radio link monitoring
    Beam failure and RLM
        Beam failure also use hypothetical PDCCH BLER
        Radio link monitoring: Potential cell-level link quality
            » Concept: Monitoring all possible beams from gNodeB
            » Maximum number of RLM-RS resources due to UE
            complexity
                2 for below 3 GHZ/4 for 3~6 GHz/8 for above
                6 GHZ
        Beam failure: Actual beam-level link quality
            » Default resource: TCI-state of CORESET that UE is
            configured for monitoring PDCCH Hereinafter, it may be assumed that transmission of (the same or different) messages is performed through at least one antenna panel (or beam. TXRU or antenna element). For example. "simultaneous" transmission based on a plurality of antenna panels (or beams, APs, TXRUs or antenna elements) may assist alleviation of a "HALF DUPLEX" problem. Otherwise, different messages transmitted through at least one antenna panel (or beam, AP. TXRU or antenna element) may be packets of service types (or priority, PROSE PER-PACKET PRIORITY (PPPP) or PROSE PER-PACKET RELIABILITY (PPPR)) of which some or all are identical (or different). Otherwise, a relatively lower PPPP value may be interpreted as a service of relatively high priority, or a higher PPPR value may be interpreted as a service of high priority (or relatively high priority).

Otherwise, the messages may be broadcast packets (or multicast packets, groupcast packets or unicast packets (for example, the case that different packets are (simultaneously) transmitted through a plurality of antenna panels (or beams, APs, TXRUs or antenna elements). For example, in case of the broadcast packets, the same packets may simultaneously be transmitted through a plurality of antenna panels (or beams, APs, TXRUs or antenna elements), and in case of the unicast packets, different packets may (simultaneously) be transmitted through a plurality of antenna panels (or beams, APs, TXRUs or antenna elements).

Otherwise, in the case that different AP indexes are mapped into a plurality of antenna panels (or beams, TXRUs or antenna elements), the message transmission may be interpreted in the form of a kind of multi-layer transmission. Also, in the case that the same AP index is mapped into a plurality of antenna panels (or beams, TXRUs or antenna elements), the message transmission may be interpreted as a kind of SINGLE-LAYER transmission.

Otherwise, (some) proposed methods of the present disclosure may be limited to TX operation (CARRIER/BWP selection), and/or RX (CARRIER/BWP) operation. For example, the term "BWP" may be interpreted as "resource pool". Also, in the case that a resource pool is configured in a BWP, numerology of the resource pool, such as sub-carrier spacing, CP type or slot format, may be defined to (always) follow that of the BWP, or numerology independent (or different) from the BWP may be configured for the resource pool.

Moreover, in the present disclosure, the term "configuration (or definition or designation)" may be enlargedly interpreted as "signaling from the network (or (PRE)CONFIGURATION)". Also, the terms "beam", "antenna panel", "AP, BASEBAND terminal AP (or digital beam AP), RF terminal AP (or analog beam AP)", "TXRU", and "antenna element", which are described in the present disclosure, may be mutually extended/cross-interpreted. For example, in the present disclosure, the terms "beam", "antenna panel". "AP". "TXRU", and "antenna element" may be enlargedly interpreted as preconfigured "beam set". "antenna panel set". "AP set". "TXRU set", and "antenna element set", respectively. Also, in the present disclosure, the term "antenna panel" may be interpreted as a unit comprised of one or more (preconfigured) "beams". "APs". "TXRUs" or "antenna elements".

Also, in the present disclosure, the term "RSRP" may be mutually and enlargedly interpreted as "(SIDELINK or SUB-CHANNEL) RSSI" or "(SIDELINK or PSSCH) RSRQ". Also, in the present disclosure, the term "PSSCH" may be mutually and enlargedly interpreted as "PSCCH" as an example.

Hereinafter, a method for independently measuring a channel state or determining transmission resources per a plurality of antenna panels (or beams. APs. TXRUs. or antenna elements) will be described.

Measurement of RSSI (sidelink Received Signal Strength Indicator)

The UE may independently perform sidelink RSSI (sidelink Received Signal Strength Indicator) measurement per antenna panel (or beam. AP. TXRU or antenna element). In this case, in the case that a corresponding rule is applied, a measurement operation, an interference measurement operation, and/or a sensing operation may be interpreted as being independently performed per antenna panel (or beam. AP. TXRU or antenna element). For example S-RSSI measurement may be performed within a resource pool (or physical resource pool) in RSSI_UNIT (or the number of subchannels). In this case, independent operation per antenna panel (or beam. AP. TXRU or antenna element) includes that a measurement operation, an interference measurement operation, and/or a sensing operation is performed per antenna panel (or beam. AP. TXRU or antenna element).

Otherwise, in the case that some or all of S-RSSI values measured for the same RSSI_UNIT per antenna panel (or beam. AP. TXRU or antenna element) are different, a minimum value may be reported or M lower values may be reported. In this case, when the minimum value or M lower values are reported. RSSI_UNIT information from which each value is obtained and/or antenna panel information from which a minimum value is obtained may be reported together. The reporting method may be used for selection of an antenna panel (or beam. AP. TXRU or antenna element) having relatively less interference and/or RSSI_UNIT.

Otherwise, at least one of a maximum value (or M higher values), an average value (or weighted average value) and all measurement values may be reported. Also RSSI_UNIT information from which the reported measurement values are respectively obtained and antenna panel (or beam. AP. TXRU or antenna element) may be reported together. For example, in the case that same messages (or different messages) are simultaneously transmitted through a plurality of antenna panels (or beams. APs. TXRUs. or antenna elements), the reporting method may be used for selection RSSI_UNIT having less interference on all the antenna panels (or beams. APs. TXRUs. or antenna elements). Otherwise, a value measured based on a preconfigured antenna panel (or beam, AP. TXRU or antenna element) may be reported. In this case, the selected (or calculated)S-RSSI value (minimum value, maximum value or average value) may be reported to a higher layer such as MAC layer, or may be reported to a BS.

PSSCH-RSRP (Physical Sidelink Shared Channel RSRP) Measurement

The UE may independently perform PSSCH-RSRP (PHYSICAL SIDELINK SHARED CHANNEL RSRP) measurement per antenna panel (or beam. AP. TXRU or antenna element). In other words, the UE may independently perform RSRP measurement for DM-RS on a data channel scheduled by a control channel which is successfully decoded, per antenna panel. In this case, at least one of the sensing operation, the interference measurement operation and the measurement operation may be performed independently per antenna panel (or beam. AP. TXRU or antenna element).

Otherwise, for example, in the same manner as the aforementioned S-RSSI, the UE may determine a minimum value or maximum value of PSSCH-RSRP values measured per antenna panel as a reference PSSCH-RSRP value, or may calculate an average value or weighted average value of PSSCH-RSRP values measured per antenna panel and determine the calculated value as the reference PSSCH-RSRP value.

Otherwise, a resource exclusive operation may be performed based on PSSCH-RSRP measurement. For example, the resource exclusive operation is an operation for excluding a resource reserved by the corresponding PSSCH if the measured PSSCH-RSRP value exceeds a threshold value. Otherwise, the resource exclusive operation may be an operation for determining a candidate resource which will transmit a signal by excluding a resource having a PSSCH-RSRP value exceeding a PSSCH-RSRP threshold value among resources included in a preconfigured resource pool. In this case, the preset PSSCH-RSRP threshold value may be preset per combination of at least two of packet priority of a corresponding UE, priority of packets to be transmitted, packet priority of another UE, and packet priority of another UE on a control channel which is successfully decoded.

In this case, the resource exclusive operation based on PSSCH-RSRP measurement may be performed independently per antenna panel (or beam. AP. TXRU or antenna element), and a resource (or physical resource) which is not excluded on all antenna panels (or beams. APs. TXRUs or antenna elements) among a plurality of resources included in the resource pool may be regarded as a finally (selectable) remaining candidate resource (REM_RSC). In this case, for example, in the resource exclusive operation independent per antenna panel, with respect to the antenna panels for the same or overlapped physical resources, the reference PSSCH-RSRP value (maximum value, minimum value, average value or weighted average value) may be assumed as a measured PSSCH-RSRP value which is a comparison target with the preset threshold value. In this case, the resource which is not excluded from more than preset antenna panels among the antenna panels (or beams. APs. TXRUs. or antenna elements) or a resource which is not excluded from a predesignated specific antenna panel may be regarded as a final candidate resource REM_RSC.

In this case, the term "resource exclusive operation" may include "an operation for increasing a PSSCH-RSRP threshold value in a predefined offset unit until a corresponding number of resources or more are ensured when the number of preconfigured resources (or the number of resources corresponding to a preset ratio) after the resource exclusive operation does not remain.

In detail, in the case that the number of REM_RSC is smaller than the number of preconfigured resources (or the number of resources corresponding to a preset ratio), the UE may re-perform the resource exclusive operation by increasing the PSSCH-RSRP threshold value per antenna panel (or beam. AP. TXRU or antenna element) (or increasing the PSSCH-RSRP threshold value as much as predefined offset unit) until the number of REM_RSC is greater than or equal to the number of preconfigured resources (or the number of resources corresponding to a preset ratio). Alternatively, the UE may consider only REM_RSC without additional resource acquisition/increase.

Otherwise, in the case that the number of REM_RSC is smaller than the number of preconfigured resources (or the number of resources corresponding to a preset ratio), the UE may primarily include resources (physical resources), which satisfy some or all of preconfigured conditions below until the number of REM_RSC is greater than or equal to the number of preconfigured resources (or the number of resources corresponding to a preset ratio). The resources that satisfy the preconfigured conditions may include i) resources excluded by a relatively small number of antenna panels (or beams. APs. TXRUs or antenna elements) (based on PSSCH-RSRP measurement), ii) resources to which a packet having priority relatively lower than priority (or priority of traffic) of a packet to be transmitted by the UE is transmitted (for example, resources to which a packet of a relatively high PPPP value or a packet of a relatively low PPPR value is transmitted), iii) randomly selected resources, resources having a relatively small value in a difference between the PSCCH-RSRP threshold value and the measured PSCCH-RSRP value, and iv) resources excluded by a beam (or AP. TXRU or antenna element) of a relatively low index (or high index) (based on PSSCH-RSRP measurement).

In this case, the preconfigured conditions may be considered when a plurality of resources excluded by the same number of antenna panels (or beams. APs. TXRUs or antenna elements) exist or a plurality of resources to which packets of the same priority are transmitted exist or when a resource of the plurality of resources, which is primarily included, is determined.

Case that CBR Values Measured Per Antenna Panel are Different

In the case that some or all of CBR values measured per antenna panel (or beam, AP. TXRU or antenna element) are different, radio-layer parameter restriction/adjustment for combination of a PPPP value (or traffic priority) of message (or message to be transmitted) and a CBR value may be applied on all antenna panels (or beams. APs. TXRUs or antenna elements) on the basis of at least one of a maximum value, a minimum value, an average value and a weighted average value of the CBR. In this case, application of radio-layer parameter restriction/adjustment may mean that congestion control related to all antenna panels (or beams. APs. TXRUs or antenna elements) is performed using the CBR value measured on antenna panel (or beam. AP. TXRU or antenna element) of a specific direction.

Also, the term "radio-layer parameter restriction/adjustment" may be "restriction for parameters such as maximum TX power. (including zero power TX), range on the number of re-TX per TB, the number of PSSCH resource blocks, and range of MCS. CR_Limit (maximum limit on occupancy ratio)". Also, the parameters may be configured differently (or independently) per combination of the PPPP value (or traffic priority) of message (or message to be transmitted) and the CBR value.

Message Transmission of Specific Antenna Panel

Otherwise, in the case that message transmission is performed using a specific antenna panel (or beam. AP. TXRU or antenna element), resource selection (or reservation) and/or congestion control (for example, radio layer parameter restriction/adjustment) may be performed based on a measurement value (for example S-RSSI, PSSCH-RSRP, CBR) on the specific antenna panel (or beam. AP. TXRU or antenna element). In this case, an antenna panel (or beam. AP. TXRU or antenna element) of a relatively low CBR value and/or an antenna panel (or beam. AP. TXRU or antenna element) of relatively good link (or channel) quality (or measurement value for a relatively good BEAM RS) among a plurality of antenna panels (or beams. APs. TXRUs or antenna elements) may primarily be selected.

Otherwise, even in case of a broadcast message, if intension for a transmission direction is definite (for example, broadcast message to be delivered to a rear direction of a vehicle), an antenna panel (or beam. AP. TXRU or antenna element) matched (or related) with the transmission direction may only be selected/used.

Message Transmission in a Plurality of Directions of a Plurality of Antenna Panels In the case that message transmission is performed in various directions using a plurality of antenna panels (or beams. APs. TXRUs or antenna elements), some or all of a first option and a second option may be applied. In this case, some or all of the messages transmitted in different directions may be different packets (or same packets), or may be different unicast packets (or broadcast packets, multicast packets or groupcast packets).

In this case, as the first option, a slot to which a resource selected from a specific (or previous) antenna panel (or beam. AP. TXRU or antenna element) belongs is excluded and then antenna panel (or beam. AP. TXRU or antenna element) related resource selection may be performed. Otherwise, message transmission between different antenna panels (or beams. APs. TXRUs or antenna elements) may be subjected to "TDM". In this case, application of rules according to the first option may mean that resource selection is independently performed between the antenna panels (or beams. APs. TXRUs or antenna elements).

As the second option, resources may be selected dependently between the antenna panels (or beams. APs. TXRUs or antenna elements). In this case, different antenna panels (or beams. APs. TXRUs or antenna elements) may perform message transmission by using different APs (or AP indexes) on the same physical resource (for example, MULTI-LAYER transmission type).

In the first option/the second option, resource selection may primarily be performed for the antenna panel (or beam. AP. TXRU or antenna element) to which a relatively low (or high) PPPP value (or relatively high (or low) PPPR value) or a message of a service having priority (or low traffic priority) is transmitted. For example, which one of the first option and the second option will be applied may previously be configured from the network, or the second option may be applied restrictively only if interference between different APs (or layers) is a preset threshold value or less. Alternatively, one of the first option and the second option, which is applied per service type (or priority, PPPP, PPPR or traffic priority), may be preconfigured differently or independently.

According to one embodiment, in the case that a UE (for example, vehicle having distributed antennas) having a plurality of antenna panels (or beams, APs, TXRUs or antenna elements) performs unicast communication (and/or groupcast communication and/or multicast communication) with a front UE, signal transmission to an antenna panel (or beam, AP. TXRU or antenna element) of an opposite direction (for example, rear side) may not be performed to avoid occurrence of unnecessary interference. However, as an example, in the case that the corresponding UE performs unicast communication (and/or groupcast communication and/or multicast communication) with a lateral UE, front and rear antennas (or beams, APs, TXRUs or antenna elements) may be required to be used to make sure of communication coverage or improve reliability.

Transmission of PA_SELRS

Otherwise, for selection of an antenna panel (or beam, AP, TXRU or antenna element) suitable for communication between UEs, a transmitting UE may transmit a preconfigured RS (or channel or signal) or PA_SELRS per antenna panel (or beam. AP. TXRU or antenna element). In this case, a receiving UE may feed PA_SELRS information (for example, PA_SELRS transmission/reception resource information, etc.) for which the best value (or M higher values) is measured and/or corresponding measurement value information back to the transmitting UE by performing measurement (for example, RSRP/RSRQ/RSSI, CSI, etc.) for PA_SELRS configured by the transmitting UE (or feedback through a predefined channel). At this time, the transmitting UE may select an antenna panel (or beam, AP, TXRU or antenna element) suitable for the receiving UE (or specific receiving UE) on the basis of the feedback information (or feedback information received from a plurality of receiving UEs).

Since the embodiments of the above-described proposed methods may be included in one of the implementation methods of the present disclosure, it will be apparent that the embodiments may be regarded as a kind of proposed methods. In addition, the above-described proposed methods (embodiments) may independently be implemented, but may also be implemented in the form of combination (or merge) of the embodiments. For example, although the proposed method of the present disclosure has been described based on the 3GPP LTE system for convenience of description, a system to which the embodiments are applied may also be extended to another system other than the 3GPP LTE system. For example, the embodiments of the present disclosure may also be enlargedly applied for D2D communication. In this case, the D2D communication means that a UE directly performs communication with another UE by using a radio channel. In this case, although the UE means a user terminal, when a network device such as the BS transmits and/or receives a signal in accordance with a communication scheme between UEs, the UE may also be regarded as a kind of the UE. Also, the embodiments of the present disclosure may be restrictively applied to MODE 3 V2X operation (and/or MODE 4 V2X operation). Also, the embodiments of the present disclosure may be restrictively applied to a preconfigured(/signaled) (specific) V2X channel (/signal) transmission (e.g., PSSCH (and/or (linked) PSCCH and/or PSBCH)). Also, for example, the proposed methods of the present disclosure may be restrictively applied to the case that a PSSCH and a (linked) PSCCH are adjacently (and/or non-adjacently) transmitted (on a frequency domain) (and/or a transmission based on a preconfigured(/signaled) MCS (and/or coding rate and/or RB) (value (/range)) is performed). Also, for example, the embodiments of the present disclosure may be restrictively applied between MODE #3 (and/or MODE #4) V2X carriers (and/or (MODE #4 (/3) SL (/UL) SPS (and/or SL (/UL) dynamic scheduling) carriers). Also, for example, the embodiments of the present disclosure may be (restrictively) applied to the case that a synchronization signal (transmission (and/or reception)) resource position and/or the number of synchronization signal resources between carriers (and/or subframe position related to V2X resource pool and/or the number of subframes (and/or subchannel size and/or the number of subchannels)) are identical (and/or (partially) different). For example, the embodiments of the present disclosure may be enlargedly applied to (V2X) communication between the BS and the UE. For example, the embodiments of the present disclosure may be restrictively applied to UNICAST (SIDELINK) communication (and/or MULTICAST (or GROUPCAST) (SIDELINK) communication and/or BROADCAST (SIDELINK) communication).

Figure 19:
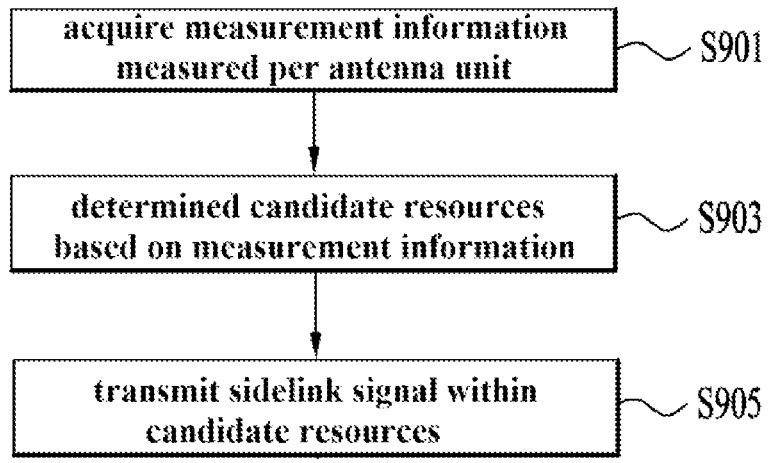
FIG. 19 is a flow chart illustrating a method for transmitting a sidelink signal in accordance with one embodiment.

FIG. 19 is a flow chart illustrating a method for performing radio link monitoring per service according to one embodiment.

A UE or a vehicle that includes a UE may include a plurality of antenna units (or distributed antenna units) distributed at each position to physically make sure of various transmission and reception directions. In this case, the UE may acquire variety of transmission and reception directions through physical dispersion among the antenna units by using the antenna units.

In this case, channel state information measured per antenna unit may be different for specific resources. In detail, a sensing (or/and measurement) result per antenna unit may be different due to self-blocking of a vehicle to which a UE is attached, reflection effect between vehicles, an effect based on an angle of an antenna unit-attached surface, an effect based on formation of different radiation patterns based on different positions, beamforming gain, antenna gain or beam orientation, etc. For example, for a vehicle of a specific position, whether a vehicle blockage exists may be determined differently for each of antenna units of different positions. In this case, the UE should determine reference information of measurement information measured differently per antenna unit to control congestion, configure transmission parameters and select transmission resources. Regarding this, a detailed method is as follows.

Referring to FIG. 19, a UE may acquire measurement information per antenna unit by measuring a channel state independently for each of a plurality of antenna units (S901). In this case, the measurement information is related to strength of a signal received per antenna unit, wherein the received signal may correspond to an interference signal. Strength of the signal may include a value of at least one of RSSI (Received Signal Strength Indicator) and RSRP (Reference Signal Received Power). Alternatively, the UE may acquire measurement information on CBR measured per antenna unit.

Next, the UE may determine candidate resources for transmitting a sidelink signal among a plurality of resources included in a resource pool on the basis of the measurement value measured per antenna unit (S903). In this case, the candidate resources may be a set of resources for randomly selecting a transmission resource by the UE. The UE may determine candidate resources on the basis of RSRP measured for the signal received per antenna unit. In detail, the UE may determine specific resources which are resources having receiving strength of a preset threshold or more among the plurality of candidate resources included in the resource pool. In this case, the specific resources may be determined independently per antenna port. The UE may determine candidate resources among the other resources excluding the independently determined specific resources from the plurality of resources included in the resource pool.

Otherwise, the UE may determine the specific resources based on one strength that satisfies a preset reference among strengths of signals measured per antenna unit. In detail, the UE may determine strength of a reference signal common for the plurality of antenna units among the strengths of the signals measured for each of the resources, in which signals (or interference signals) are received, among the plurality of resources. For example, in the case that a value of a is measured from a first antenna unit with a first resource, a value of b is measured from a second antenna unit and a value of c is measured from a third antenna unit, the UE may determine a reference measurement value for the first resource as a minimum or maximum value of a, b and c or as an average value (or weighted average value) of a, b and c. In this case, the UE may independently determine the specific resources per antenna unit by comparing the reference measurement value with the preset threshold in each antenna unit.

Otherwise, in the case that the UE transmits a sidelink signal from at least one of the plurality of antenna units, the UE may determine the specific resources for at least one antenna unit and exclude the specific resources from the candidate resources.

Otherwise, the UE may compare a ratio of the candidate resources to the plurality of resources with a preset ratio and then determine whether to include at least one of the excluded specific resources in the candidate resources. In other words, in the case that the ratio of the candidate resources to the plurality of resources is less than the preset ratio, the UE may re-determine specific resources per antenna unit. In detail, the UE may re-determine the specific resources on the basis of a repeated ratio between the specific resources determined by the plurality of antenna units when a ratio (hereinafter, candidate resource ratio) between the number of the plurality of resources and the number of the other resources excluding the specific resources from the plurality of resources is less than the preset ratio. In detail, when the candidate resource ratio is less than the preset ratio, the UE may primarily re-determine resources repeatedly determined (by the antenna units) at a high ratio among the specific resources, as the specific resources. In other words, the UE does not re-determine resources repeatedly determined at a relatively low ratio, as the specific resources. The UE may re-determine the specific resources in a way of primarily excluding the resources repeatedly determined at a relatively low ratio from the specific resources until the candidate resource ratio reaches the preset ratio or more. In other words, the UE may determine the specific resources exceptionally included in the candidate resources on the basis of an overlap ratio of the specific resources determined among the plurality of antenna units. For example, the UE may determine at least one specific resource in the order of the number of antenna units (or overlap ratio), by which predetermined resources are determined as the specific resources, from smallest to largest and include the determined specific resources in the candidate resources. Meanwhile, this operation may be performed until the candidate resource ratio reaches the preset ratio or more.

Otherwise, the UE may re-determine the specific resources per antenna unit by adjusting the preset threshold value when the candidate resource ratio is less than the preset ratio. For example, the UE may adjust the preset threshold value to increase a threshold value. In this case, the UE may adjust the preset threshold value to increase the threshold value until the candidate resource ratio reaches the preset ratio or more.

Otherwise, the UE may re-determine the specific resources by considering priority of a service provided per antenna unit when the candidate resource ratio is less than the preset ratio. For example, the specific resources determined prior to re-determination of the specific resources may be defined as first specific resources, and the specific resources which will be determined by re-determination of the specific resources may be defined as second specific resources. In this case, in the case that a plurality of antenna units provide a plurality of services, the UE may re-determine the second specific resources by considering priority (hereinafter, priority of antenna units) of services corresponding to the antenna units. For example, the UE may primarily select the first specific resources determined in only the antenna units of high priority and then re-determine the corresponding first specific resources as the second specific resources.

Otherwise, in the case that each of a plurality of sidelink signals is transmitted from each of a plurality of antenna units, the UE may independently determine a candidate resource for each of the sidelink signals by varying a time domain (TDM scheme), or may determine a candidate resource for each of the other sidelink signals by depending on the candidate resources determined for a specific one of the plurality of antenna units. In this case, a specific antenna unit which becomes a reference antenna unit may be determined based on traffic priority or traffic reliability of each of the plurality of sidelink signals. For example, the UE may determine an antenna unit, to which a sidelink signal having the highest traffic priority among the plurality of sidelink signals is transmitted, as the specific antenna unit.

Next, the UE may transmit the sidelink signals from the candidate resources (or transmission resources randomly selected within the candidate resources) (S905). In the case that the UE transmits the sidelinke signals, transmission parameters for the sidelink signals, which are previously determined in accordance with congestion control, may be used. In detail, the UE may determine a reference CBR on the basis of CBR values measured per antenna unit and perform congestion control (or determine the transmission parameter) related to the sidelink signals on the basis of the determined reference CBR.

Otherwise, prior to transmission of the sidelink signals, the UE may perform congestion control related to transmission of the sidelink signals on the basis of the CBR values measured per antenna unit. In this case, congestion control may be related to the transmission parameters of the sidelink signals, and the transmission parameters may include at least one of a maximum transmission power, retransmission times per transport block (TB), a resource block size of a PSSCH (Physical Sidelink Shared CHannel). MCS (Modulation Coding Scheme) level and CR limit (Channel Occupancy Ratio Limit) value.

In detail, the UE may select a specific one of the CBR values and determine the selected value as a reference CBR value of the congestion control. In this case, the UE may determine a minimum value, a maximum value, or an average value (or weighted average value) of the CBR values as the reference CBR value. The UE may adjust or configure the transmission parameters on the basis of the reference CBR value. Alternatively, the UE may configure the transmission parameters differently depending on combination of traffic priority (e.g., service priority of the sidelink signals. PPPP. PPPR) of the sidelink signals and the reference CBR value.

As described above, the antenna unit may be an element corresponding to or replaced with antenna panel. AP. TXRU or antenna element. Also, the antenna unit may be an element corresponding to or replaced with beam (or beam direction) formed by at least one of antenna panel. AP. TXRU and antenna element.

Communication System and Communication Device

Figure 20:
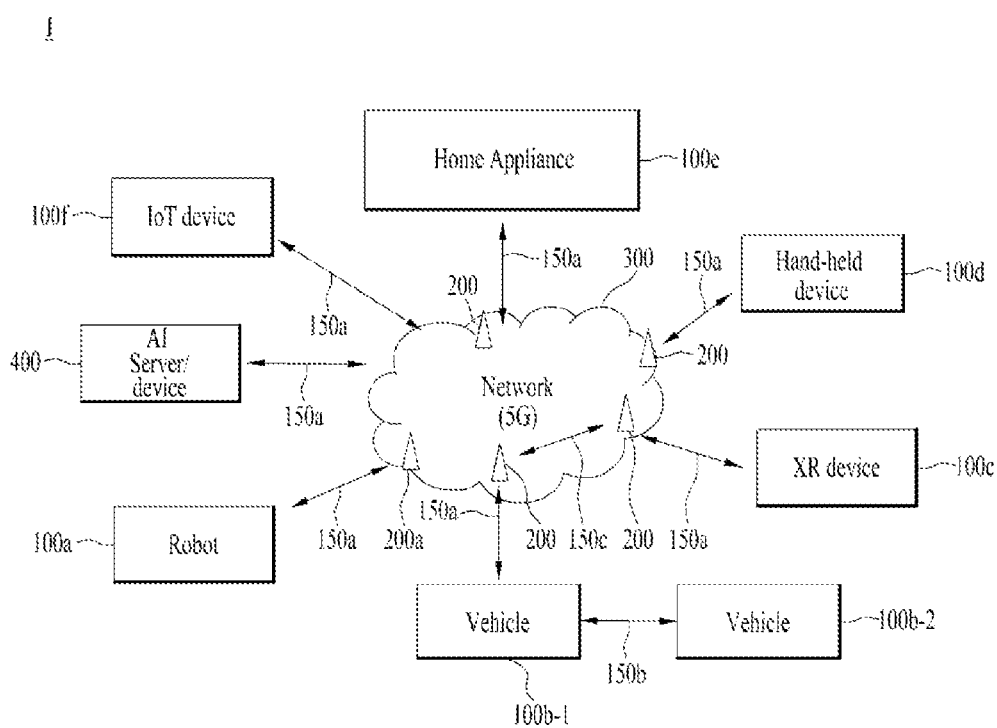
FIG. 20 illustrates a communication system applied to the present disclosure.

FIG. 20 illustrates a communication system applied to the present disclosure.

Referring to FIG. 20, a communication system I applied to the present disclosure includes wireless devices. Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IOT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., $N_R$) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G $N_R$) such as uplink/downlink communication 150a, sidelink communication 150b (or D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

As described above, the base station 200 may classify WUS signals for each UE group or subgroup. The base station is a CDM scheme according to the above-described embodiments. The WUS signal may be classified for each UE group or subgroup by using at least one of the TDM method and the FDM method. As in the above-described embodiment, the base station may be configured to distinguish WUS resources for each WUS signal. The base station may transmit WUS configuration information for the WUS resource to the UEs, such as a higher layer signal. Thereafter, the base station may transmit a corresponding WUS signal within the WUS resource corresponding to the WUS configuration information.

Examples of Wireless Devices to which the Present Disclosure is Applied

Figure 21:
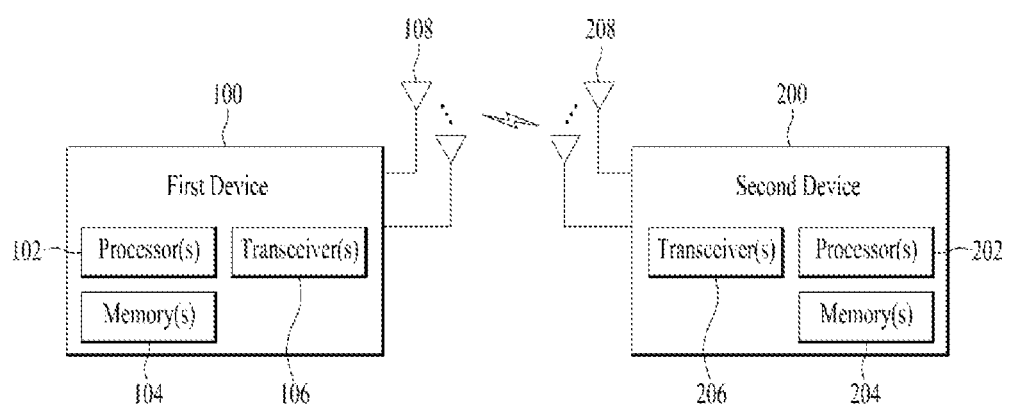
FIG. 21 illustrates wireless devices applicable to the present disclosure.

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The processor 102 may acquire measurement information related to a state of a channel for each of a plurality of antenna units on the basis of a program stored in the memory 104. The processor 102 may determine candidate resources excluding specific resources from a plurality of resources included in a preconfigured resource pool, on the basis of the measurement information. The processor 102 may transmit the sidelink signals from the determined candidate resources (or transmission resources randomly selected within the determined candidate resources) by controlling the transceiver 106.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory (s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters An Example of a Signal Processing Circuit to which the Present Disclosure is Applied FIG. 22 illustrates a signal process circuit for a transmission signal.

Figure 22:
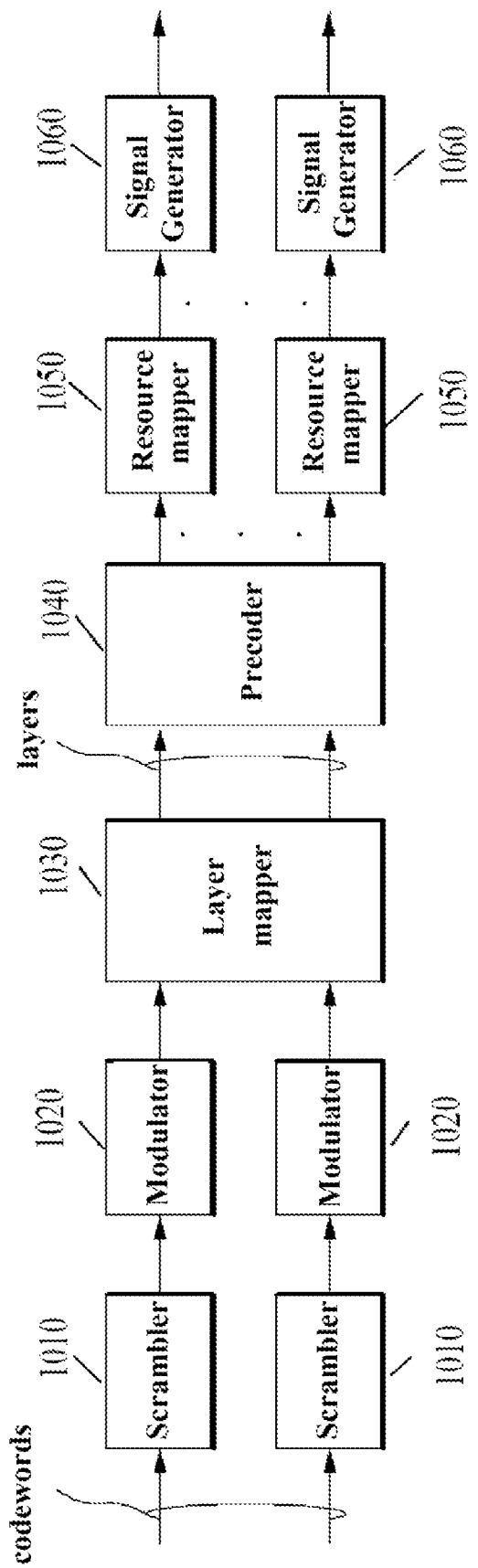
FIG. 22 illustrates a signal process circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z, of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules. Cyclic Prefix (CP) inserters. Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters. Analog-to-Digital Converters (ADCs). CP remover, and Fast Fourier Transform (FFT) modules. Next, the baseband signals may be restored to codewords through a resource demapping procedure, a postcoding procedure, a demodulation processor and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Wireless Devices to which the Present Disclosure is Applied

Figure 23:
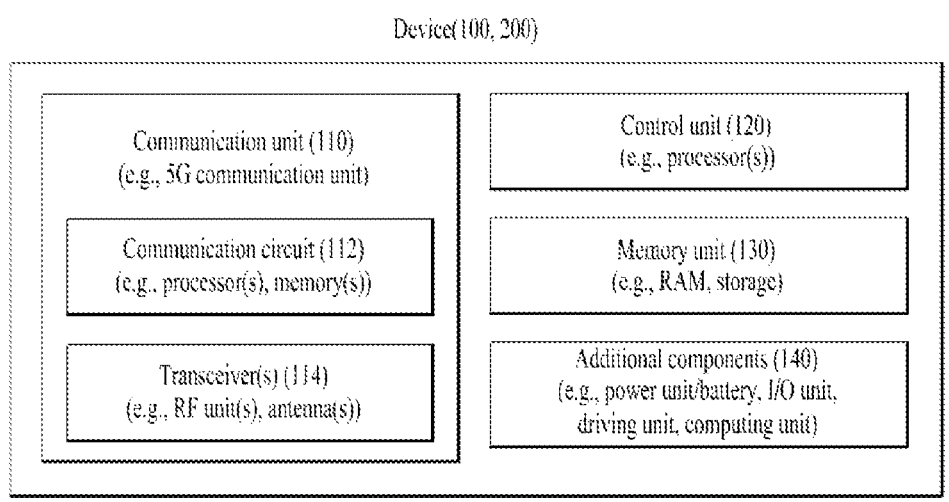
FIG. 23 illustrates another example of a wireless device applied to the present disclosure.

FIG. 23 illustrates another example of a wireless device applied to the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. W1), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor an application processor an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 24:
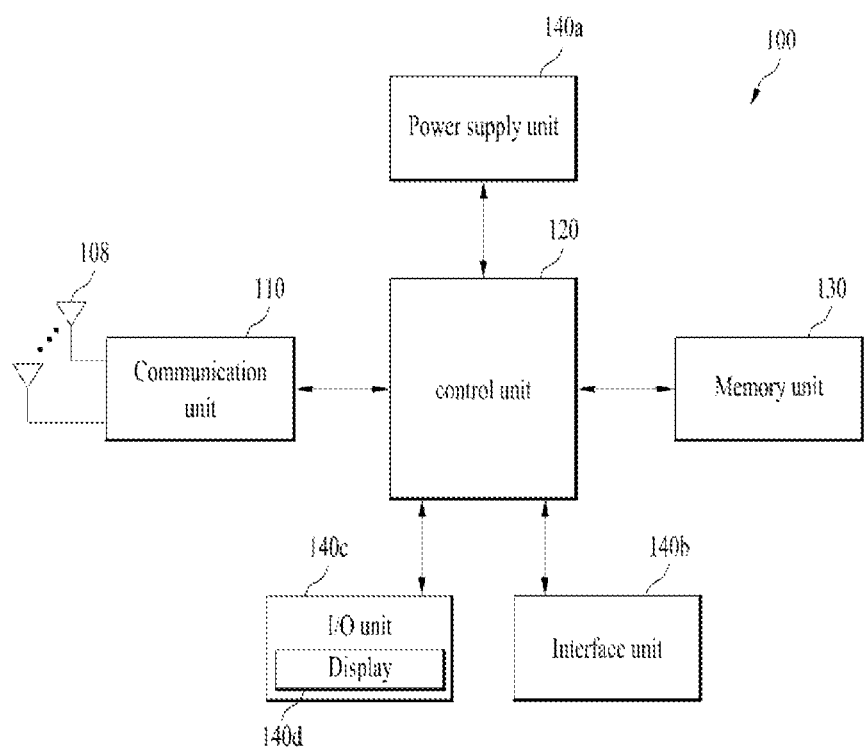
FIG. 24 illustrates a hand-held device applied to the present disclosure.

Hereinafter, an example of implementing FIG. 23 will be described in detail with reference to the drawings Examples of Mobile Devices to which the Present Disclosure is Applied FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
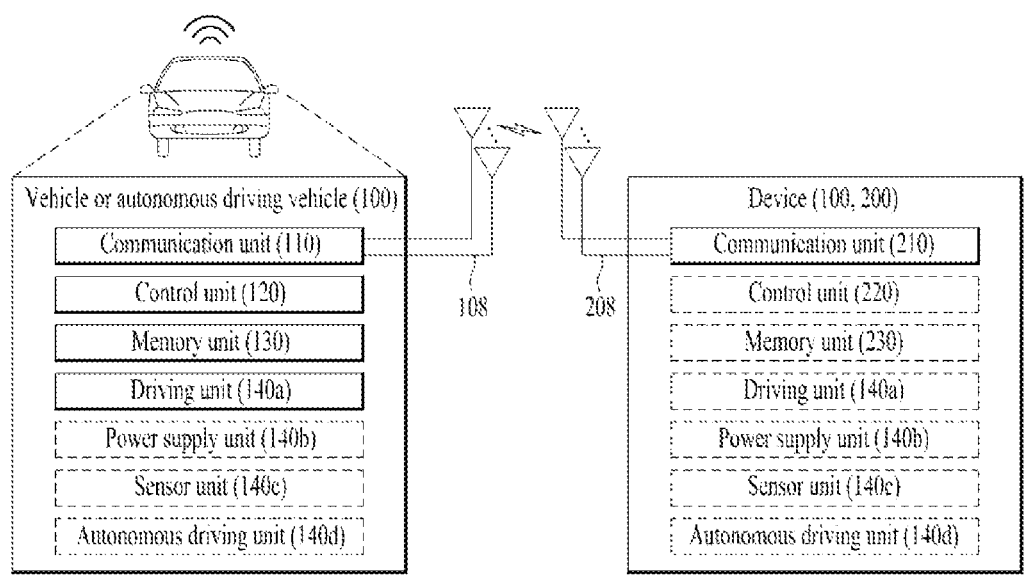
FIG. 25 illustrates a vehicle or an autonomous driving vehicle applied to the present disclosure.

Examples of Vehicles or Autonomous Vehicles to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor a collision sensor a wheel sensor a speed sensor a slope sensor a weight sensor a heading sensor a position module, a vehicle forward/backward sensor a battery sensor a fuel sensor a tire sensor a steering sensor a temperature sensor a humidity sensor an ultrasonic sensor an illumination sensor a pedal position sensor etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described above, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method for transmitting a sidelink signal by a user equipment (UE) in a wireless communication system supporting a sidelink, the method comprising steps of:
   receiving configuration information for a resource pool for the sidelink signal;
   selecting first candidate resources from the resource pool;
   acquiring measurement information that includes a Reference Signal Received Power (RSRP) that is measured for each of a plurality of antenna units;
   determining second candidate resources based on the acquired measurement information, the determined second candidate resources excluding specific resources from the first candidate resources selected from the resource pool; and
   transmitting the sidelink signal within the determined second candidate resources,
   wherein the method further includes independently determining, for each of the plurality of antenna units, the specific resources for which the RSRP that is measured for each of the plurality of antenna units is greater than or equal to a predetermined threshold, and
   wherein, based on a ratio of the second candidate resources to the first candidate resources being less than a predetermined ratio, the method further comprises determining a specific resource to be exceptionally included in the second candidate resources from among the specific resources based on an overlap ratio of the specific resource among the plurality of antenna units.

2. The method of claim 1, wherein the measurement information further includes a RSSI (Received Signal Strength Indicator) measured for each of the plurality of antenna units.

3. The method of claim 1, wherein the measurement information further includes CBR (Channel Busy Ratio) values measured for the plurality of antenna units.

4. The method of claim 3, wherein transmission parameters related to the sidelink signal are determined based on one CBR value selected among the CBR values.

5. The method of claim 4, wherein the transmission parameters are configured differently per combination of the selected one CBR value and traffic priority related to the sidelink signal.

6. The method of claim 4, wherein the transmission parameters include at least one of a maximum transmission power related to congestion control of a channel, retransmission times per transport block (TB), a resource block size of a PSSCH (Physical Sidelink Shared Channel), MCS (Modulation Coding Scheme) level or a CR limit value (Channel Occupancy Ratio Limit).

7. The method of claim 1, further comprising:
selecting information on at least one of the plurality of antenna units and on the RSRP measured for the at least one of the plurality of antenna units; and
reporting the selected information to a higher layer.

8. The method of claim 7, wherein the information on the at least one of the plurality of antenna units is selected from the plurality of antenna units on the basis of strengths of signals received in a preconfigured resource region.

9. The method of claim 1, wherein, in a case that the sidelink signal is transmitted from a specific one of the plurality of antenna units, the specific resource is determined based on the RSRP measured for a corresponding specific one of the plurality of antenna units.

10. The method of claim 1, wherein each of the plurality of antenna units corresponds to any one of an antenna panel, an antenna port, a TXRU (Transceiver Unit), an antenna element, or a beam.

11. The method of claim 1, wherein the plurality of antenna units are mutually distributed and disposed to acquire signals from a variety of transmission and reception directions through a physical distribution of the plurality of antenna units.

12. A device for transmitting a sidelink signal in a wireless communication system supporting a sidelink, the device comprising:
a transceiver;
a processor for controlling the transceiver; and
a memory for storing a program for an operation of the processor,
wherein the processor:
controls the transceiver to receive configuration information for a resource pool for the sidelink signal,
selects first candidate resources from the resource pool,
acquires measurement information including a Reference Signal Received Power (RSRP) measured for each of a plurality of antenna units,
determines second candidate resources excluding specific resources from the first candidate resources based on the measurement information, and
transmits the sidelink signal within the second candidate resources,
wherein the processor independently determines, for each of the plurality of antenna units, the specific resources for which the RSRP that is measured for each of the plurality of antenna units is greater than or equal to a predetermined threshold, and
wherein, based on a ratio of the second candidate resources to the first candidate resources being less than a predetermined ratio, the processor determines a specific resource to be exceptionally included in the second candidate resources from among the specific resources based on an overlap ratio of the specific resource among the plurality of antenna units.

* * * * *